United States Patent
Abreu et al.

(10) Patent No.: US 12,543,215 B2
(45) Date of Patent: Feb. 3, 2026

(54) SUPPORT FOR IDLE PERIOD COMMUNICATION IN SEMI-STATIC CHANNEL ACCESS

(71) Applicant: Nokia Technologies Oy, Espoo (FI)

(72) Inventors: Renato Barbosa Abreu, Aalborg (DK); Claudio Rosa, Aalborg (DK); Roberto Maldonado, Aalborg (DK); Morten Toft, Aalborg (DK); Timo Erkki Lunttila, Espoo (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 379 days.

(21) Appl. No.: 18/247,395

(22) PCT Filed: Aug. 30, 2021

(86) PCT No.: PCT/EP2021/073855
§ 371 (c)(1),
(2) Date: Mar. 30, 2023

(87) PCT Pub. No.: WO2022/083927
PCT Pub. Date: Apr. 28, 2022

(65) Prior Publication Data
US 2024/0008072 A1    Jan. 4, 2024

Related U.S. Application Data

(60) Provisional application No. 63/104,287, filed on Oct. 22, 2020.

(51) Int. Cl.
*H04W 74/00* (2009.01)
*H04W 74/08* (2009.01)

(52) U.S. Cl.
CPC ......... *H04W 74/006* (2013.01); *H04W 74/08* (2013.01)

(58) Field of Classification Search
CPC ........... H04W 74/006; H04W 74/0816; H04W 72/0446; H04W 16/14; H04W 74/08;
(Continued)

(56) References Cited

U.S. PATENT DOCUMENTS

| 10,536,972 B2 | 1/2020 | Kim et al. |
| 2019/0335456 A1 | 10/2019 | Yerramalli et al. |

(Continued)

FOREIGN PATENT DOCUMENTS

| WO | 2016/122228 A1 | 8/2016 |
| WO | 2019/038701 A1 | 2/2019 |
| WO | 2020/162804 A1 | 8/2020 |

OTHER PUBLICATIONS

"3rd Generation Partnership Project; Technical Specification Group Radio Access Network; NR; Radio Resource Control (RRC) protocol specification (Release 16)", 3GPP TS 38.331, V16.1.0, Jul. 2020, pp. 1-906.

(Continued)

*Primary Examiner* — Quoc Thai N Vu
(74) *Attorney, Agent, or Firm* — Carter, DeLuca & Farrell LLP

(57) ABSTRACT

There are provided measures for enabling/realizing support for idle period communication in semi-static channel access. Such measures exemplarily comprise that a user equipment device monitors for presence of a clearance indication provided by a base station device serving the user equipment device, which indicates clearance for communication by the user equipment device in at least one idle period of a base station device frame period, disables communication by the user equipment device in the at least one idle period of the base station device frame period when the monitoring yields absence of the clearance indication, and enables communication by the user equipment device in the at least one idle (Continued)

period of the base station device frame period when the monitoring yields presence of the clearance indication.

1 Claim, 13 Drawing Sheets

(58) Field of Classification Search
CPC ............ H04W 74/0808; H04W 74/004; H04L 5/0082
See application file for complete search history.

(56) References Cited

U.S. PATENT DOCUMENTS

| | | |
|---|---|---|
| 2020/0037354 A1 | 1/2020 | Li et al. |
| 2020/0314891 A1 | 10/2020 | Li et al. |
| 2022/0377683 A1* | 11/2022 | Myung ............. H04W 74/0816 |
| 2024/0089983 A1* | 3/2024 | Koorapaty .......... H04W 72/232 |

OTHER PUBLICATIONS

"Revised WID: Enhanced Industrial Internet of Things (IoT) and ultra-reliable and low latency communication (URLLC) support for NR", 3GPP TSG RAN Meeting #88e, RP-201310, Agenda: 9.10.5, Nokia, Jun. 29-Jul. 3, 2020, 6 pages.

"5 GHz RLAN; Harmonised Standard covering the essential requirements of article 3.2 of Directive 2014/53/EU", ETSI EN 301 893, V2.1.1, May 2017, pp. 1-122.

"Summary#5 on enhancements for unlicensed band URLLC/IIoT for R17", 3GPP TSG RAN WG1 Meeting #102-e, R1-2007391, Agenda: 8.3.2, Ericsson, Aug. 17-28, 2020, 66 pages.

"Uplink enhancements for URLLC in unlicensed controlled environments", 3GPP TSG RAN WG1 Meeting #102-e, R1-2006801, Agenda: 8.3.2, Qualcomm Incorporated, Aug. 17-28, 2020, 7 pages.

Patriciello et al., "NR-U and IEEE 802.11 Technologies Coexistence in Unlicensed mmWave Spectrum: Models and Evaluation", IEEE Access, vol. 8, Apr. 13, 2020, pp. 71254-71271.

"3rd Generation Partnership Project; Technical Specification Group Radio Access Network; Physical layer procedures for shared spectrum channel access (Release 16)", 3GPP TS 37.213, V16.3.0, Sep. 2020, pp. 1-26.

International Search Report and Written Opinion received for corresponding Patent Cooperation Treaty Application No. PCT/EP2021/073855, dated Dec. 21, 2021. 11 pages.

Notice of Allowance received for corresponding European Patent Application No. 21769139.3, dated Apr. 5, 2024, 8 pages.

* cited by examiner

SUPPORT FOR IDLE PERIOD COMMUNICATION IN SEMI-STATIC CHANNEL ACCESS

RELATED APPLICATION

This application was originally filed as PCT Application No. PCT/EP2021/073855, filed on Aug. 30, 2021, which claims priority from US Provisional Application No. 63/104,287, filed on Oct. 22, 2020, each of which is incorporated herein by reference in its entirety.

FIELD

The present disclosure relates to support for idle period communication in semi-static channel access. More specifically, the present disclosure relates to measures/mechanisms (including methods, apparatuses (i.e. devices, elements and/or functions) and computer program products) for enabling/realizing support for idle period communication in semi-static channel access.

BACKGROUND

The present disclosure generally refers to support of applications having strict requirements in terms of reliability and latency in cellular communication systems. In this regard, unlicensed spectrum support in cellular communication systems is regarded, as is provided e.g. by 5G/NR-U. Accordingly, a target/use scenario for the present disclosure refers to support of URLLC/IIoT in 5G/NR-U. As URLLC/IIoT applications have very strict requirements in terms of reliability and latency (e.g. 99.999% success probability within latency as low as 1 ms), there is a need for enhancements in 5G/NR-U for supporting URLLC/IIoT use cases. For example, there is a need for uplink enhancements in unlicensed controlled environments, i.e. environments which contain only devices installed by a facility owner, and where unexpected interference from other systems and/or radio access technology only sporadically happens.

Herein, 3GPP specifications of physical layer procedures for shared spectrum channel access are exemplarily assumed as a basis. More specifically, reference is made to an FBE (Frame Base Equipment) channel access procedure, also known as semi-static channel access, as specified in section 4.3 of 3GPP TS 37.213 V16.3.0 (the contents of which is herewith incorporated by reference).

Such procedure is based on the concept of a fixed frame period (FFP) which is a periodic channel occupancy time (COT) followed by an idle period.

The standard FBE channel access procedure, assuming channel occupancy initiated by a gNB and shared with a UE (i.e. the gNB acting as initiating device and the UE acting as responding device), can be basically outlined as follows.

The gNB indicates the fixed frame period (FFP) configuration to the UE through SIB1 or dedicated RRC signaling The FFP duration values are restricted to {1 ms, 2 ms, 2.5 ms, 4 ms, 5 ms, 10 ms}, including the idle period. The idle period for a given SCS is ceil(minimum idle period allowed by regulations/Ts), where ceil stands for a ceiling function, minimum idle period allowed by regulations is the maximum of 5% of FFP and 100□s), and Ts is the symbol duration for the given SCS. The idle period is located at the end of the FFP.

To initiate a COT, the gNB as the initiating device performs a single-shot LBT for 9□s within a 25□s interval immediately before the COT (i.e. before the start of the FFP), and immediately starts DL transmission if the channel is available. Thereby, the gNB acquires the COT.

The gNB can pause and resume DL transmission within the gNB-acquired COT without performing another LBT if the gap between the consecutive DL transmissions is below 16□s, or after another LBT for 9□s if the gap is higher.

Similarly, the UE as the responding device can initiate UL transmission within the gNB-acquired COT without performing an LBT if the gap between a DL transmission by the initiating device (gNB) and the UL transmission by the responding device (UE) is below 16□s, or after an LBT for 9□s if the gap is higher. The UE (as the responding device) can however only transmit in UL after detecting a DL transmission from the gNB, i.e. upon detecting presence of a gNB-acquired COT.

This means that the UE is only allowed to transmit within a COT initiated/acquired by the gNB, i.e. as a responding device. Such restriction was agreed to reduce specification effort but can cause reliability/latency degradation which is particularly severe for IIoT/URLLC applications. This is because the UE cannot perform transmissions on UL configured resources (e.g. PRACH, CG-PUSCH, PUCCH, SR) outside a gNB-initiated/acquired COT.

Therefore, enhancements are needed for addressing such UL restriction. More specifically, support for UE-initiated COT for Frame Based Equipment (FBE) is needed.

For semi-static channel access, the following agreements are currently made.

When a gNB operates as the initiating device, the gNB is not allowed to transmit during the idle period of any FFP associated with the gNB in which the gNB initiates a COT, When a UE operates as the initiating device, the UE is not allowed to transmit during the idle period of any FFP associated with the UE in which the UE initiates a COT.

When a UE shares a COT initiated by a gNB during an FFP associated with the gNB, the UE is not allowed to transmit during the idle period of that FFP in which the UE shares the COT initiated by the gNB.

When a gNB shares a COT initiated by a UE during an FFP associated with the UE, the gNB is not allowed to transmit during the idle period of that FFP in which the gNB shares the COT initiated by the UE.

When operating using semi-static channel access procedure, the duration of the FFP determines how often there will be a possibility to acquire the COT and access the resources for the transmission. Therefore, a UE which needs to transmit UL transmissions with low latency, using e.g. CG-PUSCH, is expected to be configured with short FFP durations, while for the gNB, which serves multiple UEs, it may be preferable to operate with longer FFPs. Further, the start of UE FFP and the start of gNB FFP may be different. Assuming different FFP durations, there is thus the possibility that a UE-initiated COT may collide with a gNB FFP idle period.

However, current agreements do not define whether a UE which has initiated a COT can transmit in the idle period of an overlapping gNB FFP. As explained below, both options of allowing and prohibiting UL transmission of a UE which has initiated a COT in the idle period of an overlapping gNB FFP are detrimental.

If a UE is allowed to initiate a COT and is also allowed to transmit during the idle period of an overlapping gNB FFP, it may block the gNB from acquiring the COT and serve the network during the next gNB FFP. This is however undesirable in terms of service availability as well as reliability and latency.

One obvious way to avoid this problem is to prohibit the UE from transmitting during the idle period of an overlapping gNB FFP even when the UE is the initiating device (whereas current specifications/agreements only prevent this when the UE is the responding device). This would however cause the UE to stop its transmission (during the idle period) even when the gNB has no intention to acquire the COT in the next gNB FFP (and thus does not need to use its idle period for initiating/requesting the COT in the next gNB FFP). Clearly, this can result in reliability/latency degradation, as all UL transmissions overlapping with the gNB idle period need to be dropped, and UL transmissions may suffer from increased delay.

Therefore, there is a need for measures/mechanisms for (enabling/realizing) support for idle period communication in semi-static channel access. More specifically, with regard to the above example scenario, there is a need for obviating the UL restriction imposed on the UE and to facilitate appropriate support for UE-initiated COT for Frame Based Equipment (FBE), namely UE communication during an idle period of a gNB in semi-static channel access mode.

SUMMARY

Various exemplifying embodiments of the present disclosure aim at addressing at least part of the above issues and/or problems and drawbacks.

Various aspects of exemplifying embodiments of the present disclosure are set out in the appended claims.

The scope of protection sought for various embodiments of the disclosure is set out by the independent claims. The embodiments and/or examples and features, if any, described in this specification that do not fall under the scope of the independent claims are to be interpreted as examples useful for understanding various embodiments of the disclosure.

According to an example aspect of the present disclosure, there is provided a method of wireless communication in a communication system supporting semi-static channel access, the method comprising: monitoring for presence of a clearance indication provided by a base station device serving a user equipment device, which indicates clearance for communication by the user equipment device in at least one idle period of a base station device frame period, and disabling communication by the user equipment device in the at least one idle period of the base station device frame period when the monitoring yields absence of the clearance indication, or enabling communication by the user equipment device in the at least one idle period of the base station device frame period when the monitoring yields presence of the clearance indication.

According to an example aspect of the present disclosure, there is provided an apparatus for wireless communication in a communication system supporting semi-static channel access, said apparatus comprising at least one processor; and at least one memory including computer program code, wherein the at least one memory and the computer program code are configured, with the at least one processor, to cause the apparatus at least to perform: monitoring for presence of a clearance indication provided by a base station device serving a user equipment device, which indicates clearance for communication by the user equipment device in at least one idle period of a base station device frame period, and disabling communication by the user equipment device in the at least one idle period of the base station device frame period when the monitoring yields absence of the clearance indication, or enabling communication by the user equipment device in the at least one idle period of the base station device frame period when the monitoring yields presence of the clearance indication.

According to an example aspect of the present disclosure, there is provided an apparatus for wireless communication in a communication system supporting semi-static channel access, comprising: means or circuitry for monitoring for presence of a clearance indication provided by a base station device serving a user equipment device, which indicates clearance for communication by the user equipment device in at least one idle period of a base station device frame period, and means or circuitry for disabling communication by the user equipment device in the at least one idle period of the base station device frame period when the monitoring yields absence of the clearance indication, or means or circuitry for enabling communication by the user equipment device in the at least one idle period of the base station device frame period when the monitoring yields presence of the clearance indication.

According to various developments/modifications, any one of the aforementioned method-related and/or apparatus-related example aspects of the present disclosure may include one or more of the following features (which may, as appropriate, be realized/implemented as respective method or process step, operation, function, means, elements, circuitry):

enabling communication may comprise at least one of: continuing transmission by the user equipment device in a channel occupancy time of a user equipment device frame period, resuming transmission by the user equipment device in a channel occupancy time of a user equipment device frame period, or initiating a new channel occupancy time for communication by the user equipment device in a subsequent user equipment device frame period, disabling communication may comprise at least one of: suspending transmission by the user equipment device in a channel occupancy time of a user equipment device frame period, or resuming transmission by the user equipment device in a channel occupancy time of a user equipment device frame period after the at least one idle period of the base station device frame period, inhibiting observation of at least some downlink transmissions by and/or downlink channels from the base station device in at least part of a subsequent channel occupancy time of the base station device frame period when the monitoring yields presence of the clearance indication, performing observation of at least some downlink transmissions by and/or downlink channels from the base station device in at least part of a subsequent channel occupancy time of the base station device frame period when the monitoring yields absence of the clearance indication, acquiring a configuration for monitoring for presence of the clearance indication, said configuration including information on provision of the clearance indication by the base station device, wherein presence of the clearance indication may be monitored in accordance with the acquired configuration, the clearance indication may be provided by the base station device in a channel occupancy time of a user equipment device frame period or a channel occupancy time of the base station device frame period, monitoring reception of a clearance indication message, signal, indicator or information from the base station device, either within or prior to the at least one idle period of the base station device frame period, the clearance indication message, signal, indicator or information may be received in a form of or as part of at least one of downlink control information, reference signals, or higher layer signaling, monitoring may comprise: monitoring provision of a schedule for uplink transmission by the user equipment device from the base station device, and inferring presence of the clearance indication when the provided schedule for uplink transmission by the user equipment device includes a transmission time partially or fully overlapping the at least one idle period of the base station device frame period, the method/apparatus may be operable at or by or as the user equipment device, the user equipment device and the base station device may be operable as frame based equipment devices, the communication system may comprise a 5G/NR system.

According to an example aspect of the present disclosure, there is provided a method of wireless communication in a communication system supporting semi-static channel access, the method comprising: determining intention of communication by a base station device in a channel occupancy time of a base station device frame period, and providing a clearance indication to a user equipment device served by the base station, which indicates clearance for communication by the user equipment device in at least one idle period of the base station device frame period.

According to an example aspect of the present disclosure, there is provided an apparatus for wireless communication in a communication system supporting semi-static channel access, said apparatus comprising at least one processor; and at least one memory including computer program code, wherein the at least one memory and the computer program code are configured, with the at least one processor, to cause the apparatus at least to perform: determining intention of communication by a base station device in a channel occupancy time of a base station device frame period, and providing a clearance indication to a user equipment device served by the base station, which indicates clearance for communication by the user equipment device in at least one idle period of the base station device frame period.

According to an example aspect of the present disclosure, there is provided an apparatus for wireless communication in a communication system supporting semi-static channel access, comprising: means or circuitry for determining intention of communication by a base station device in a channel occupancy time of a base station device frame period, and means or circuitry for providing a clearance indication to a user equipment device served by the base station, which indicates clearance for communication by the user equipment device in at least one idle period of the base station device frame period.

According to various developments/modifications, any one of the aforementioned method-related and/or apparatus-related example aspects of the present disclosure may include one or more of the following features (which may, as appropriate, be realized/implemented as respective method or process step, operation, function, means, elements, circuitry):

providing the clearance indication may enable the user equipment device to communicate in the at least one idle period of the base station device frame period, comprising at least one of: continuing transmission by the user equipment device in a channel occupancy time of a user equipment device frame period, resuming transmission by the user equipment device in a channel occupancy time of a user equipment device frame period, or initiating a new channel occupancy time for communication by the user equipment device in a subsequent user equipment device frame period, providing the clearance indication may trigger the user equipment device to perform: inhibiting observation of at least some downlink transmissions by and/or downlink channels from the base station device in at least part of a subsequent channel occupancy time of the base station device frame period, detecting initiation of a channel occupancy time for communication by the user equipment device in a user equipment device frame period, wherein intention of communication by the base station device in a channel occupancy time of a base station device frame period may be determined when the initiation of the channel occupancy time for communication by the user equipment device in the user equipment device frame period is detected, identifying at least one of a need or ability of the user equipment device to communicate in the at least one idle period of the base station device frame period, wherein the clearance indication may be provided to the user equipment when the identifying yields that there is at least one of the communication need or ability of the user equipment device.

identifying at least one of the communication need or ability of the user equipment device may be based on at least one of: available and/or configured uplink transmission resources of the user equipment device in a channel occupancy time of a user equipment device frame period in the at least one idle period of the base station device frame period, buffer status information of the user equipment device from a previous transmission, or prior knowledge of upcoming and/or scheduled communication by the user equipment device, the clearance indication may be provided to the user equipment device in a channel occupancy time of a user equipment device frame period or a channel occupancy time of the base station device frame period, configuring the user equipment device for monitoring for presence of the clearance indication, said configuration including information on provision of the clearance indication by the base station device, providing the clearance indication may comprise: causing transmission of a clearance indication message, signal, indicator or information to the user equipment device, either within or prior to the at least one idle period of the base station device frame period, the clearance indication message, signal, indicator or information may be transmitted in a form of or as part of at least one of downlink control information, reference signals, or higher layer signaling, providing the clearance indication may comprise: providing a schedule for uplink transmission by the user equipment device to the user equipment device, wherein the user equipment device may be enabled to infer presence of the clearance indication when the provided schedule for uplink transmission by the user equipment device includes a transmission time partially or fully overlapping the at least one idle period within the base station device frame period, the method/apparatus may be operable at or by or as the base station device, the user equipment device and the base station device may be operable as frame based equipment devices, the communication system may comprise a 5G/NR system.

According to example aspects of the present disclosure, there are provided computer program products comprising (computer-executable) computer program code which, when the program code is executed (or run) on a computer or the program is run on a computer (e.g. a computer of an apparatus according to any one of the aforementioned apparatus-related example aspects of the present disclosure), is configured to cause the computer to carry out the method according to any one of the aforementioned method-related example aspects of the present disclosure.

The computer program product may comprise or may be embodied as a (tangible/non-transitory) computer-readable (storage) medium or the like, on which the computer-executable computer program code is stored, and/or the program is directly loadable into an internal memory of the computer or a processor thereof.

Further developments and/or modifications of the aforementioned exemplary aspects of the present disclosure are set out in the following.

By way of exemplifying embodiments of the present disclosure, support for idle period communication in semi-static channel access can be enabled/realized. That is, exemplifying embodiments of the present disclosure provide various measures/mechanisms (such as functions, extensions of functions and procedures) that facilitate, with regard to the above example scenario, obviating a UE UL restriction and providing for an appropriate support for UE-initiated COT for Frame Based Equipment (FBE), namely UE communication during an idle period of a gNB in semi-static channel access mode (i.e. a gNB FFB).

BRIEF DESCRIPTION OF THE DRAWINGS

In the following, the present disclosure will be described in greater detail by way of non-limiting examples with reference to the accompanying drawings, in which.

DETAILED DESCRIPTION

Figure 1:
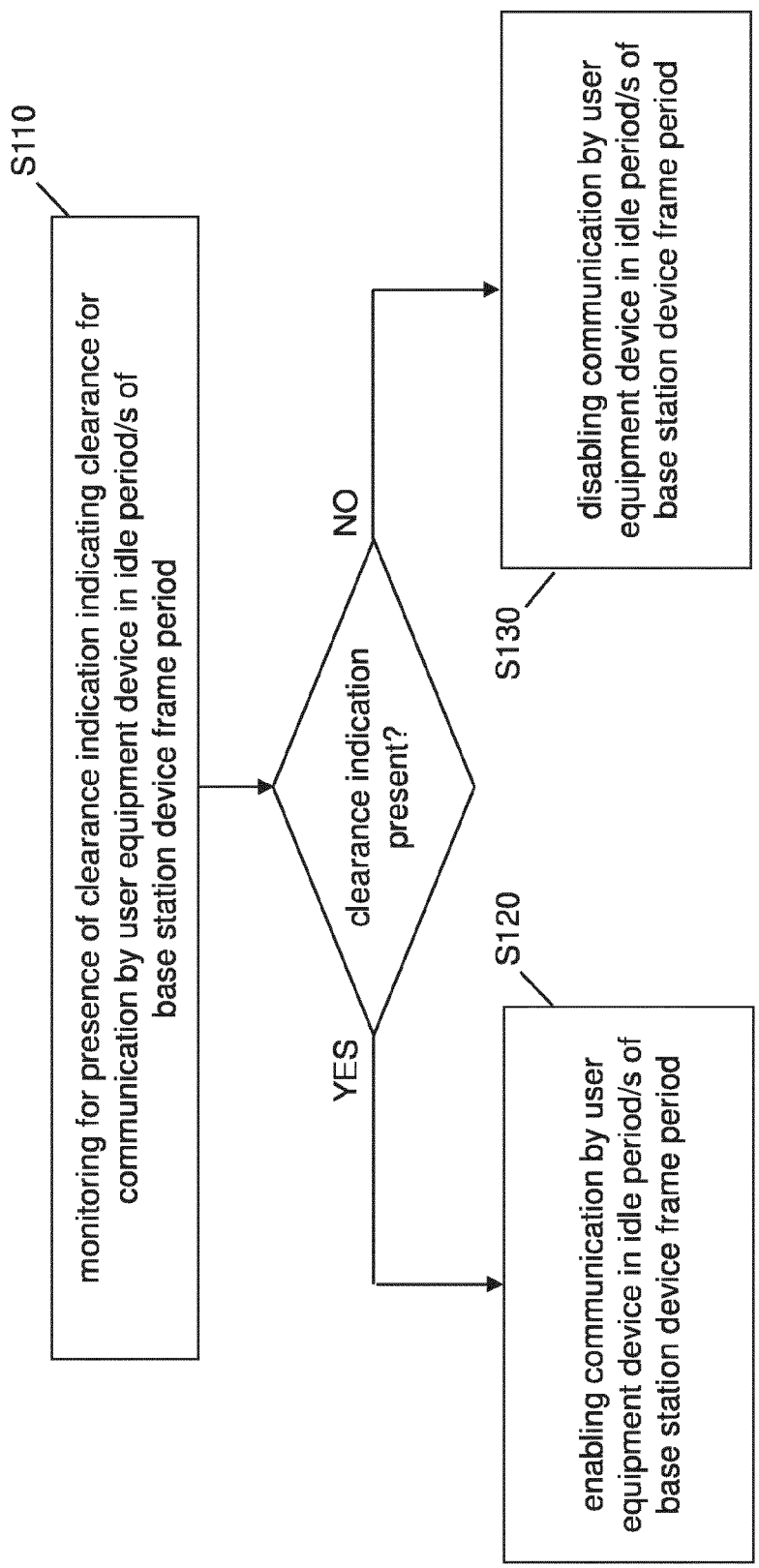
FIG. 1 shows a flowchart illustrating an example of a method or process according to at least one exemplifying embodiment.

The present disclosure is described herein with reference to particular non-limiting examples and to what are presently considered to be conceivable (examples of) embodiments. A person skilled in the art will appreciate that the present disclosure is by no means limited to these examples and embodiments, and may be more broadly applied.

It is to be noted that the following description mainly refers to specifications being used as non-limiting examples for certain exemplifying network configurations and system deployments. Namely, the following description mainly refers to communication systems/technologies according to 3GPP specifications. As such, the description of exemplifying embodiments given herein specifically refers to terminology which is directly related thereto. Such terminology is only used in the context of the presented non-limiting examples and embodiments, and does naturally not limit the present disclosure in any way. Rather, any other network configurations and system deployments may equally be utilized as long as complying with what is described herein and/or exemplifying embodiments described herein are applicable to it. For example, any communication system and entity, which supports semi-static channel access or a similar channel access procedure, is equally applicable in any networking scenario, which is suitable for shared spectrum or unlicensed spectrum communication, irrespective of the underlying standards or specifications.

Hereinafter, various exemplifying embodiments and implementations of the present disclosure and its aspects are described using several variants and/or alternatives. It is generally to be noted that, according to certain needs and constraints, all of the described variants and/or alternatives may be provided alone or in any conceivable combination (also including combinations of individual features of the various variants and/or alternatives). In this description, the words "comprising" and "including" should be understood as not limiting the described exemplifying embodiments and implementations to consist of only those features that have been mentioned, and such exemplifying embodiments and implementations may also contain features, structures, units, modules etc. that have not been specifically mentioned.

In the drawings, it is to be noted that lines/arrows interconnecting individual blocks or entities are generally meant to illustrate an operational coupling there-between, which may be a physical and/or logical coupling, which on the one hand is implementation-independent (e.g. wired or wireless) and on the other hand may also comprise an arbitrary number of intermediary functional blocks or entities not shown. In flowcharts or signaling diagrams, the illustrated order of operations or actions is generally illustrative/exemplifying, and any other order of respective operations or actions is equally conceivable, if feasible.

According to exemplifying embodiments of the present disclosure, in general terms, there are provided measures/mechanisms (including methods, apparatuses (i.e. devices, elements and/or functions) and computer program products) for enabling/realizing support for idle period communication in semi-static channel access.

For exemplifying embodiments of the present disclosure as described herein, a (wireless/cellular) communication system is assumed, which provides unlicensed spectrum support and supports semi-static channel access. For example, the (wireless/cellular) communication system can be realized by a 5G/NR-U system. Further, it is assumed that a communication control or management element/function, which is referred to as base station device, and a communication element/function, which is referred to as user equipment device, are connected or linked via at least one channel of the (wireless/cellular) communication system such that the base station device serves the user equipment device. In terms of channel access (on an unlicensed spectrum), an FBE-based LBT scheme is assumed, as outlined above. Accordingly, the base station device and the user equipment device are operable as FBE devices or, stated in other words, in a FBE(-based) communication system.

Generally, it is to be noted that the present disclosure relates to channel access procedures, specifically semi-static channel access. Accordingly, when herein reference is made to an idle period, this is not meant as a period of RRC Idle state or the like, but this is meant as a period where a device needs to be silent prior to attempting to acquire the channel in an unlicensed spectrum/band (i.e. the idle period includes a period/chance for channel sensing or LBT). For example, an idle period as referred to herein is an idle period of a fixed frame period (FFP), which is the underlying principle of FBE(-based) channel access procedures.

FIG. 1 shows a flowchart illustrating an example of a method or process according to at least one exemplifying embodiment. The method or process of FIG. 1 is operable at or by a user equipment device, such as e.g. a user equipment device in a FBE(-based) communication system, e.g. a UE in a 5G/NR-U system.

As shown in FIG. 1, a process (method) according to at least one exemplifying embodiment comprises an operation (S110) of monitoring for presence of a clearance indication provided by a base station device serving the user equipment device, which indicates clearance for communication by the user equipment device in at least one idle period of a base station device frame period, i.e. base station device FFP. That is, the clearance indication (i.e. its presence) indicates that the base station device does not intend to communicate in a subsequent channel occupancy time (COT) of the base station device frame period, i.e. a subsequent base station device FFP, namely that the base station device does not intend to initiate/acquire the subsequent COT, and vice versa. When the monitoring yields presence of the clearance indication, the process (method) further comprises an operation (S120) of enabling (or allowing) communication by the user equipment device in the at least one idle period of the base station device frame period, i.e. base station device FFP. When the monitoring yields absence of the clearance indication, the process (method) further comprises an operation (S130) of disabling (or inhibiting) communication by the user equipment device in the at least one idle period within the base station device frame period, i.e. base station device FFP.

Accordingly, the capability of the user equipment device to perform user equipment device-initiated communication, i.e. transmissions by the user equipment device using/during a channel occupancy time (COT) of its own frame period, i.e. a user equipment device FFP, is controlled depending on presence absence of the clearance indication, i.e. whether or not the base station device has an intention of performing subsequent communication using/during a channel occupancy time (COT) of its own frame period.

As evident from the below description, according to exemplifying embodiments of the present disclosure, monitoring for presence of a clearance indication may involve or mean monitoring at least one (pre-configured) monitoring period or occasion (e.g. for receiving/decoding the clearance indication), checking a (pre-configured/established) schedule such as a time domain resource assignment (e.g. for inferring/recognizing the clearance indication), or any other conceivable way of getting knowledge of a clearance indication provided by the base station device.

Irrespective of the illustrated operations in FIG. 1, the user equipment device may initiate a channel occupancy time (COT) for communication by the user equipment device. If so, the clearance indication can be provided by or received from the base station device using this user equipment device-initiated COT. Otherwise, if the user equipment device does not have an own initiated COT, the clearance indication can be provided by or received from the base station device using a base station device-initiated COT, i.e. a channel occupancy time (COT) for communication by the base station device, which has previously been initiated by the base station device.

In the operation (S120) of enabling (or allowing) communication by the user equipment device in the at least one idle period within the base station device frame period, i.e. base station device FFP, the user equipment may for example continue a transmission by the user equipment device in a channel occupancy time (COT) of a user equipment device frame period, i.e. a user equipment device FFP, and/or resume transmission by the user equipment device in a channel occupancy time (COT) of a user equipment device frame period, i.e. a user equipment device FFP, and/or initiate a new channel occupancy time (COT) for communication by the user equipment device in a subsequent user equipment device frame period, i.e. a subsequent user equipment device FFP. In this regard, the transmission by the user equipment device may be an UL transmission towards the base station device, a sidelink transmission towards another user equipment device, or any other kind of transmission which can be carried out by the user equipment device (as an initiating device).

In the operation (S130) of disabling (or inhibiting) communication by the user equipment device in the at least one idle period within the base station device frame period, i.e. base station device FFP, the user equipment may (after stopping transmission by the user equipment device prior to the at least one idle period of the base station device frame period, i.e. base station device FFP) for example suspend (ongoing or scheduled) transmission by the user equipment device in a channel occupancy time (COT) of a user equipment device frame period, i.e. a user equipment device FFP, and/or resume transmission by the user equipment device in a channel occupancy time (COT) of a user equipment device frame period, i.e. the user equipment device FFP, after the at least one idle period of the base station device frame period, i.e. the base station device FFP (if some ongoing or scheduled transmission is left). In this regard, the transmission by the user equipment device may be an UL transmission towards the base station device, a sidelink transmission towards another user equipment device, or any other kind of transmission which can be carried out by the user equipment device (as an initiating device).

Figure 2:
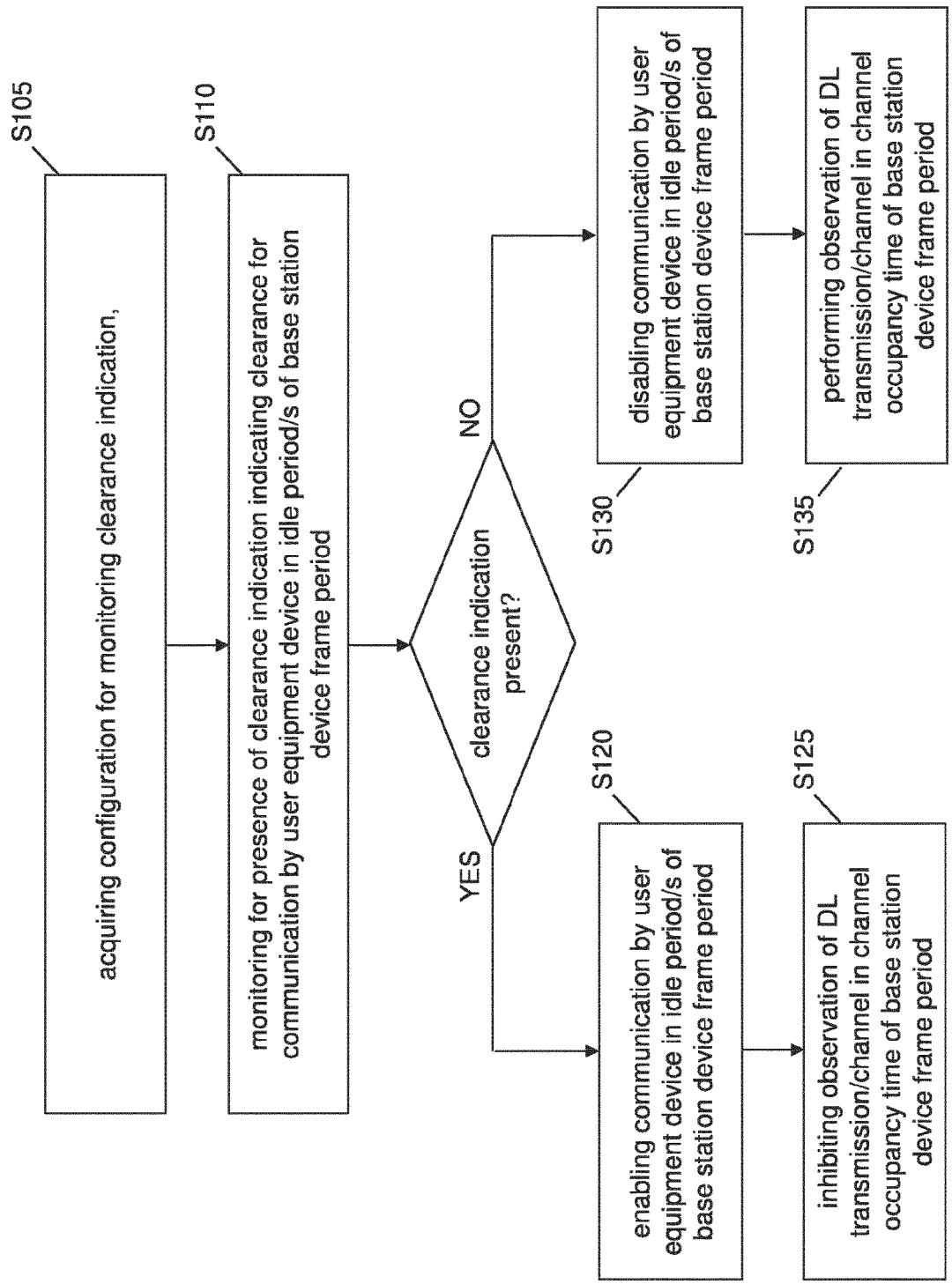
FIG. 2 shows a flowchart illustrating an example of a method or process according to at least one exemplifying embodiment.

FIG. 2 shows a flowchart illustrating an example of a method or process according to at least one exemplifying embodiment. Similar to FIG. 1, the method or process of FIG. 2 is operable at or by a user equipment device, such as e.g. a user equipment device in a FBE(-based) communication system, e.g. a UE in a 5G/NR-U system.

In FIG. 2, operations which are similar/equivalent to those of FIG. 1 are denoted by the same reference numerals, and their repetitive description is omitted while referring to the above description thereof in the context of FIG. 1.

As shown in FIG. 2, a process (method) according to at least one exemplifying embodiment additionally comprises an operation (S105) of acquiring a configuration for monitoring presence of the aforementioned clearance indication, said configuration including information on provision of the clearance indication by the base station device. Then, the user equipment device is configured/enabled to monitor for presence of the clearance indication in accordance with the acquired configuration (S110).

As shown in FIG. 2, a process (method) according to at least one exemplifying embodiment additionally comprises an operation of controlling observation (or monitoring) of DL communication from the base station device depending on presence or absence of the clearance indication. For example, as illustrated as operation S125, the user equipment device may inhibit (or stop) observation of at least some DL transmissions by and/or DL channels from the base station device in at least part of a subsequent channel occupancy time (COT) of the base station device frame period, i.e. a subsequent base station device FFP, when the monitoring yields presence of the clearance indication. Namely, even if the user equipment device does not intend or is not configured to transmit, i.e. to perform an transmission, it may refrain from observing/monitoring (at least certain) DL signals and/or channels (e.g. PDCCH, CSI-RS, SSBs, etc.) in (the subsequent COT of) the base station device FFP after detecting presence of the clearance indication, thereby saving power (in view of the knowledge, provided by presence of the clearance indication, that the base station device does not intend to subsequently communicate (as initiating device) in the base station device FFP). For example, as illustrated as operation S135, the user equipment device may perform (or allow) observation of at least some DL transmissions by and/or DL channels from the base station device in at least port of a subsequent channel occupancy time (COT) of the base station device frame period, i.e. a subsequent base station device FFP, when the monitoring yields absence of the clearance indication. Namely, the user equipment device may observe/monitor DL signals and/or channels (e.g. PDCCH, CSI-RS, SSBs, etc.) in (the subsequent COT of) the base station device FFP after detecting absence of the clearance indication (in view of the knowledge, provided by absence of the clearance indication, that the base station device intends to subsequently communicate (as initiating device) in the base station device FFP).

It is to be noted that, although all of operations S105, S125 and S135 are illustrated in FIG. 2, these operations are inherently independent of each other such that any one or more of these operations can be separately realized/implemented, respectively.

Figure 3:
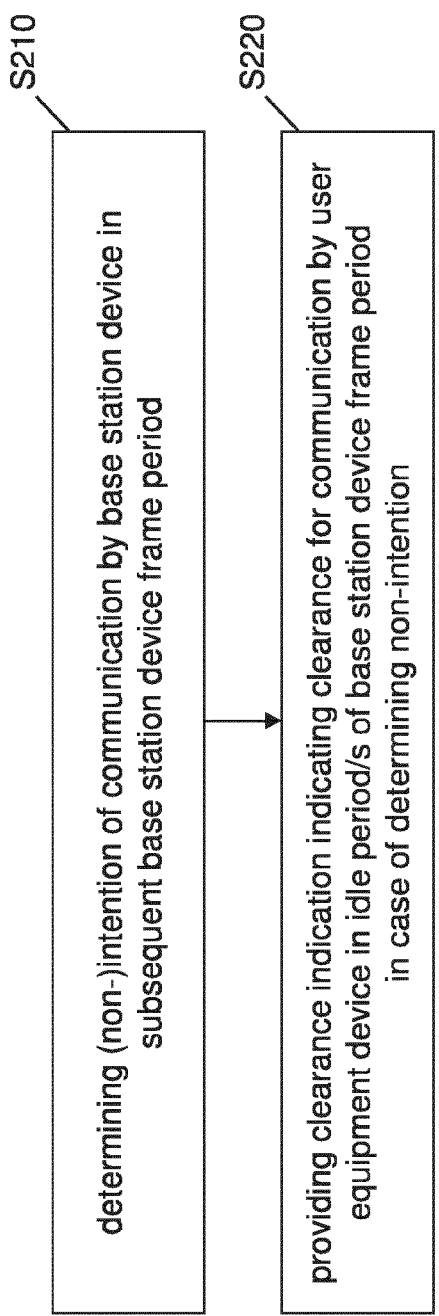
FIG. 3 shows a flowchart illustrating an example of a method or process according to at least one exemplifying embodiment.

FIG. 3 shows a flowchart illustrating an example of a method or process according to at least one exemplifying embodiment. The method or process of FIG. 3 is operable at or by a base station device, such as e.g. a base station device in a FBE(-based) communication system, e.g. a gNB in a 5G/NR-U system.

As shown in FIG. 3, a process (method) according to at least one exemplifying embodiment comprises an operation (S210) of determining (non-)intention of communication by the base station device in a channel occupancy time (COT) of a base station device frame period, i.e. a base station device FFP, and an operation (S220) of providing a clearance indication to the user equipment device served by the base station, which indicates clearance for communication by the user equipment device in at least one idle period of the base station device frame period, i.e. the base station device FFP, when the determining yields absence of the intention (as is exemplarily assumed in FIG. 3). That is, the clearance indication (i.e. its provision) indicates that the base station device does not intend to communicate in a channel occupancy time (COT) of a base station device frame period, i.e. a base station device FFP, namely that the base station device does not intend to initiate/acquire the subsequent COT, and vice versa.

As described above, the user equipment device (upon a corresponding monitoring) is enabled to appropriately control its communication/transmission depending on presence or absence of the clearance indication by the base station device. Accordingly, the capability of the user equipment device to perform user equipment device-initiated communication, i.e. transmissions by the user equipment device using/during a channel occupancy time (COT) of its own frame period, i.e. a user equipment device FFP, is controlled depending on presence absence of the clearance indication, i.e. whether or not the base station device has an intention of performing subsequent communication using/during a channel occupancy time (COT) of its own frame period.

Figure 4:
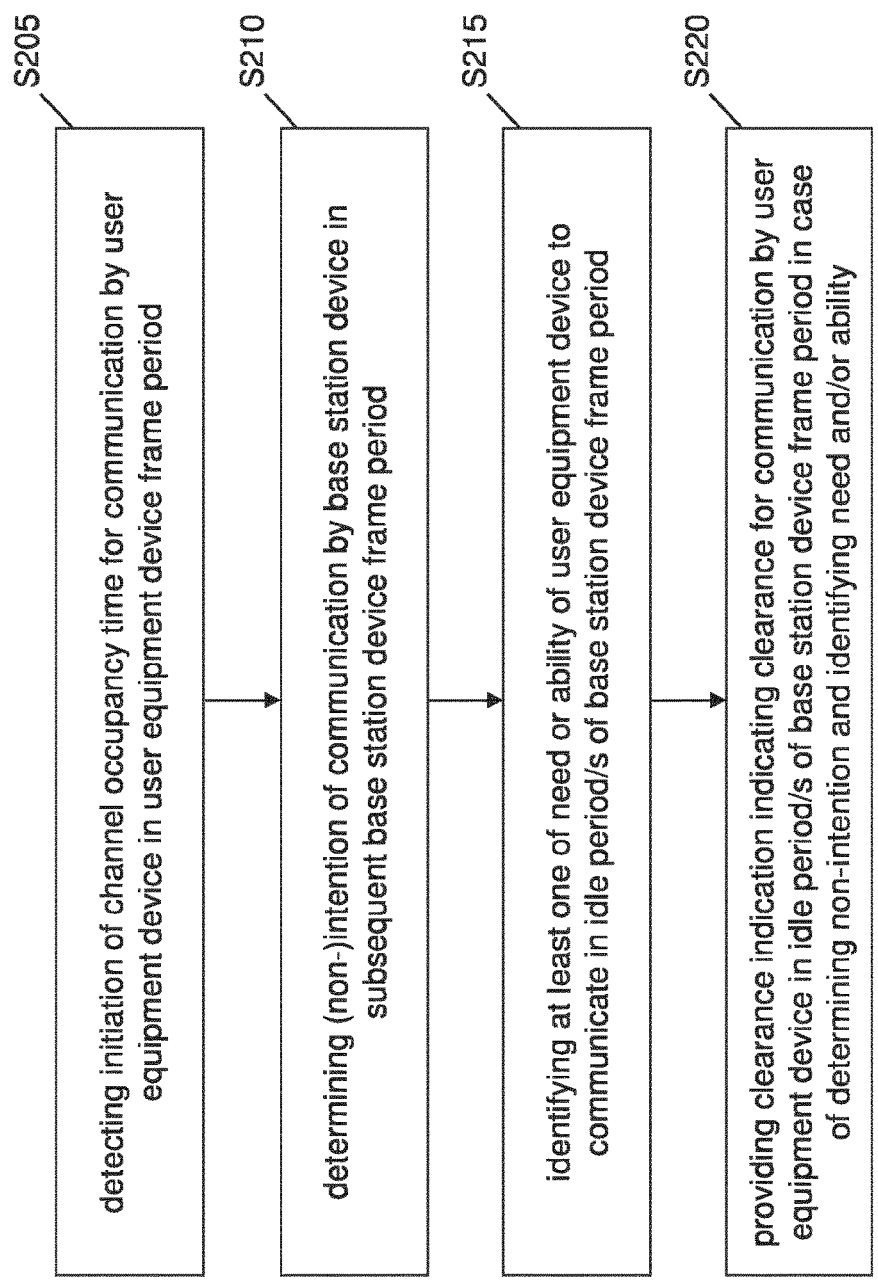
FIG. 4 shows a flowchart illustrating an example of a method or process according to at least one exemplifying embodiment.

FIG. 4 shows a flowchart illustrating an example of a method or process according to at least one exemplifying embodiment. Similar to FIG. 3, the method or process of FIG. 4 is operable at or by a base station device, such as e.g. a base station device in a FBE(-based) communication system, e.g. a gNB in a 5G/NR-U system.

In FIG. 4, operations which are similar/equivalent to those of FIG. 3 are denoted by the same reference numerals, and their repetitive description is omitted while referring to the above description thereof in the context of FIG. 3.

As shown in FIG. 4, a process (method) according to at least one exemplifying embodiment additionally comprises an operation (S205) of detecting initiation of a channel occupancy time (COT) for communication by the user equipment device in a user equipment device frame period, i.e. a user equipment device FFP, which indicates that the user equipment device intends to communicate in a channel occupancy time (COT) of the user equipment device time period (FFP). The base station device may determine its intention of communication in the channel occupancy time (COT) of the base station device FFP (only) when the initiation of the channel occupancy time (COT) for communication by the user equipment device in the user equipment device frame period, i.e. a user equipment device FFP, is detected. Thereby, the determination operation may be performed only when appropriate, i.e. only when a situation of (partial) overlapping of at least one idle period of the base station device frame period and the channel occupancy time (COT) of the user equipment device frame period could occur.

In the case that initiation of a channel occupancy time (COT) for communication by the user equipment device is detected, this user equipment device-initiated COT can be used by the base station device to provide/transmit the clearance indication to the user equipment device. In another case, in which the base station device has itself initiated a channel occupancy time (COT) for communication by the base station device (as an operation prior to, during or after operation S210), this base station device-initiated COT can be used by the base station device to provide/transmit the clearance indication to the user equipment device.

As shown in FIG. 4, a process (method) according to at least one exemplifying embodiment additionally comprises an operation of controlling provision of the clearance indication (not only depending on the base station device's own intention of communication in the (subsequent) COT of the base station device FFP, but also) depending on the user equipment device's communication prospect/intention. Namely, as illustrated as operation S215, the base station device may (before, after or during the determination operation S210 in FIG. 3) identify at least one of a need or ability of the user equipment device to communicate in the at least one idle period of the base station device frame period, i.e. the base station device FFP. Then, the base station device may provide the clearance indication (only) when the identifying yields that there is at least one of the communication need or ability of the user equipment device (and, in addition, there is no base station device's own intention of communication in the (subsequent) COT of the base station device FFP), as is exemplarily assumed in FIG. 4. For example, the identification of the at least one of the communication need or ability of the user equipment device may be based on available and/or configured UL transmission or communication resources of the user equipment device channel occupancy time (COT) of a user equipment device frame period during the at least one idle period of the base station device frame period, and/or buffer status information (such as e.g. BSR) of the user equipment device from a previous transmission or communication, and/or prior knowledge of upcoming and/or scheduled communication or transmission by the user equipment device. Thereby, the clearance indication may be provided only when appropriate/necessary, thereby saving power. Otherwise, if not being appropriate/necessary, the base station device may refrain from providing the clearance indication, which in case of transmission of a corresponding message, signal, indicator or information would also reduce channel occupancy and save traffic (or signaling) overhead.

Also, the determination operation (S210) by the base station device may (only) be performed when there is a potential need for providing a clearance indication, namely when a communication collision could occur. This may be detected by the base station device in any manner. For example, the base station device may detect that there is a UL transmission from the user equipment device. The base station device can know (and detect) this, since the transmissions of the user equipment device can only occur in UL occasions pre-configured by the base station device. So, if the base station device detects a UL transmission in any configured occasion, it will know that the user equipment device initiated a COT to transmit something. This also holds for the at least one idle period of the base station device, in that the base station device monitors configured occasions during its idle period/s and knows that a user equipment device frame period has started if it detects a transmission there.

The gNB can also know that the UE has further transmissions, based e.g. on buffer status report from previous transmission, or based on prior knowledge of the traffic, e.g. periodic TSC traffic, etc.

It is to be noted that, although all of operations S205 and S215 are illustrated in FIG. 4, these operations are inherently independent of each other such that any one or more of these operations can be separately realized/implemented, respectively.

Although not illustrated in FIGS. 3 and 4, the processes (methods) may further comprise a configuration of the user equipment device by the base station device. Such configuration includes a configuration relating to the clearance indication. For example, the base station device may configure (i.e. provide, instruct or establish a configuration of/for) the user equipment device for monitoring for presence of the clearance indication, and the user equipment device may acquire (and realize, implement or apply) this configuration by/from the base station device and monitor presence of the clearance indication in accordance with the acquired configuration (as evident from operation S105). The configuration may include information on provision of the clearance indication by the base station device. For example, the base station device may configure the user equipment device (in an operation prior to operation S220)) to monitor for presence of the clearance indication, including information on the clearance indication provision, such as how and/or where and/or when the clearance indication is provided and can thus be monitored. Stated in other words, the base station device may enable the user equipment device to detect/recognize the clearance indication. Such configuration may for example be realized through RRC signaling/configuration. Details on different ways of providing the clearance indication (which can be indicated by such configuration) are described below.

Also, the configuration of the user equipment device by the base station device may be applied as needed. For example, the user equipment device may be configured for monitoring (i.e. listening to/for) for presence of the clearance indication when there is a potential need for providing a clearance indication, namely when a communication collision could occur, or when the user equipment device is interested in transmitting during at least one idle period of the base station frame period (FFP). Such potential need can be recognized by the base station device or by the user equipment device. For example, the base station device may detect that there is a UL transmission from the user equipment device, as described above. For example, the user equipment device may detect this as the base station frame period (FFP), as well as the idle period/s therein, is known by the UE e.g. based on SSB or RRC configuration.

In the following, examples according to exemplary embodiments of the present disclosure are described for illustrative (but not limiting) purposes.

In the below examples, a 5G/NR-U system is adopted as an exemplary communication system, in which the gNB represents a base station device according to exemplary embodiments of the present disclosure, and the UE represents a user equipment device according to exemplary embodiments of the present disclosure.

Figure 5:
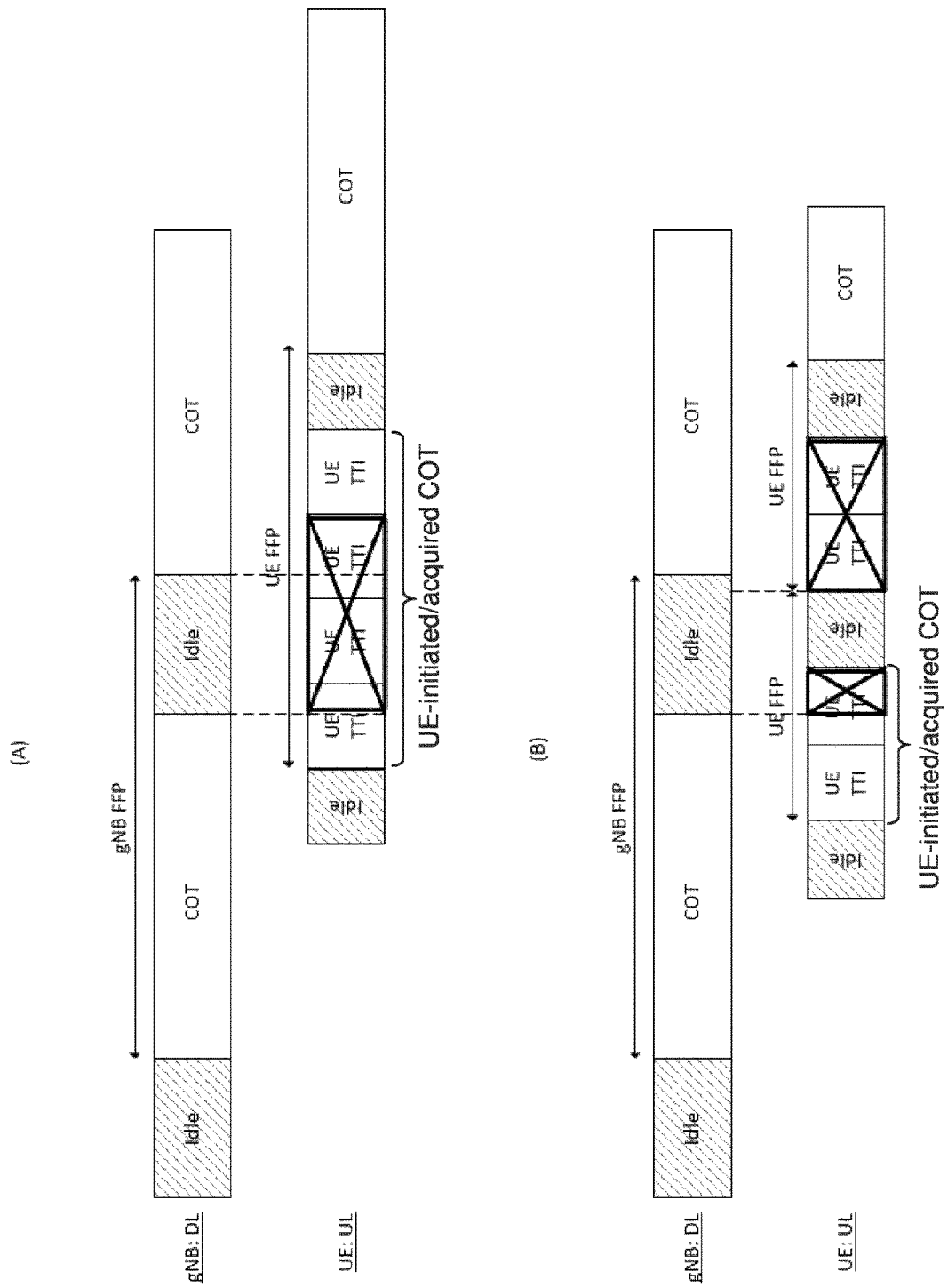
FIG. 5 shows a conceptual diagram illustrating two examples of semi-static channel occupancy.
Figure 6:
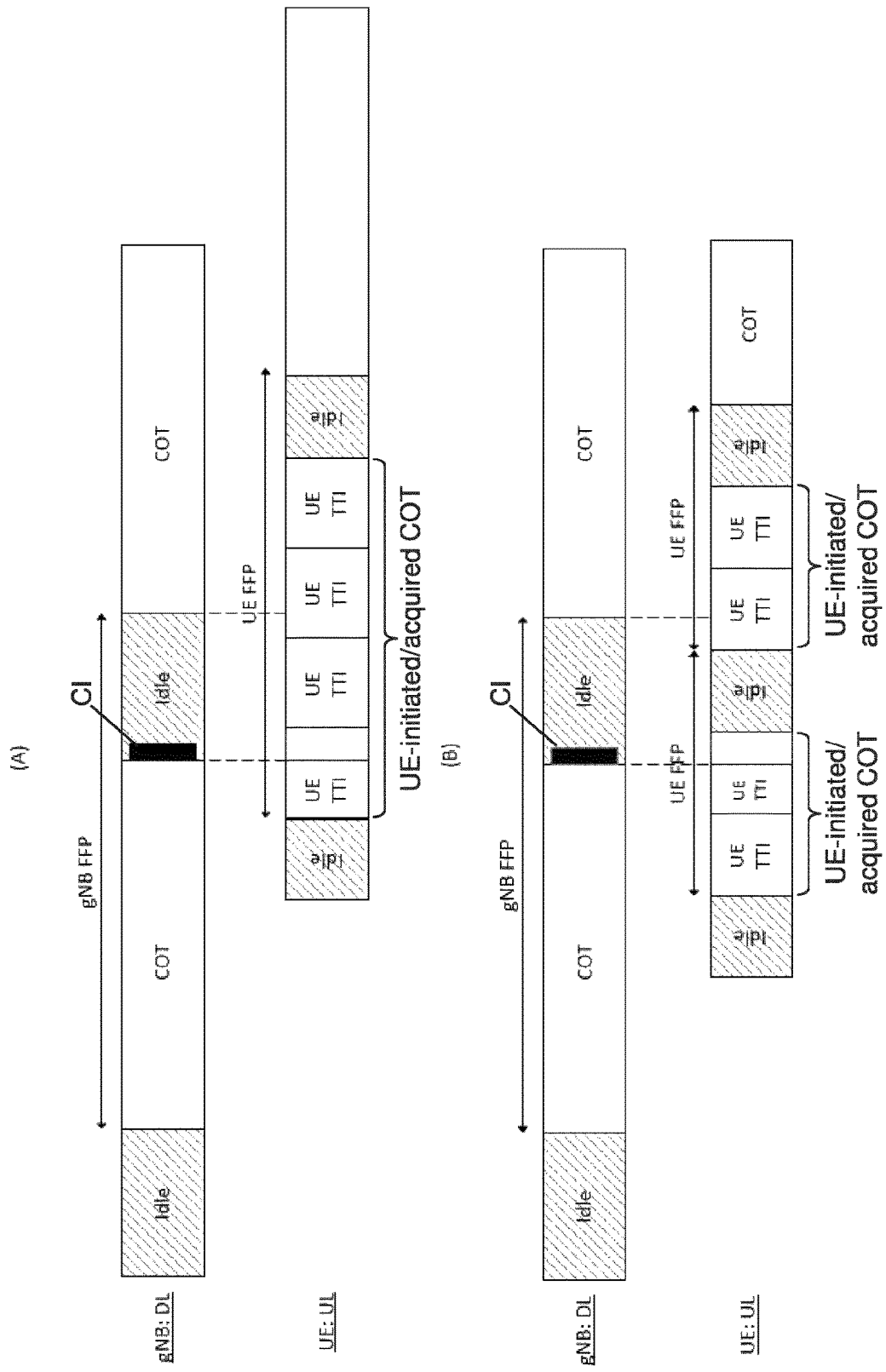
FIG. 6 shows a conceptual diagram illustrating two examples of semi-static channel occupancy according to at least one exemplifying embodiment.
Figure 7:
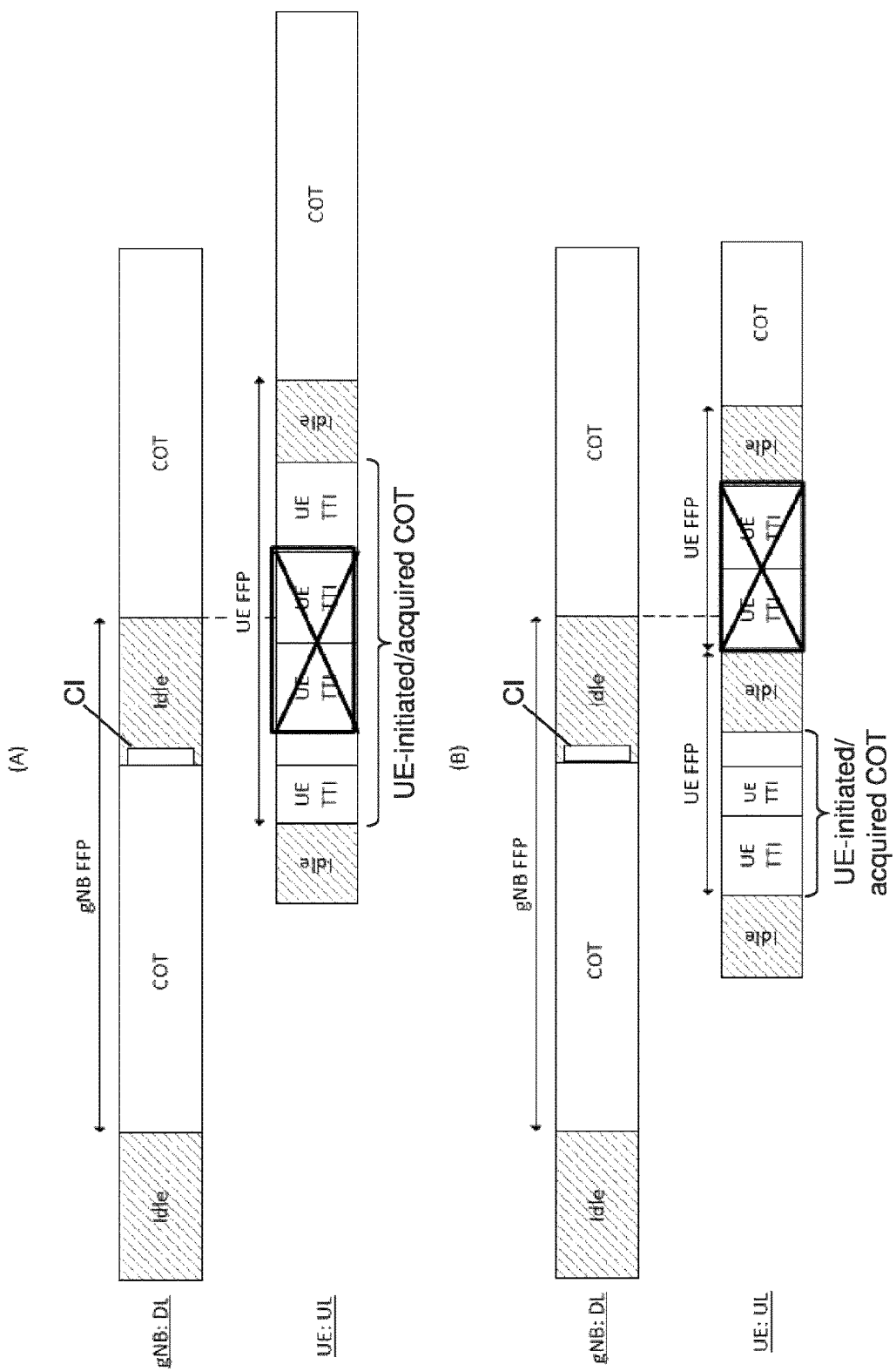
FIG. 7 shows a conceptual diagram illustrating two examples of semi-static channel occupancy according to at least one exemplifying embodiment.

In FIGS. 5 to 7, a framework of semi-static channel access of a UE and a gNB is depicted as a basis. Namely, assuming that both UE and gNB operate in semi-static channel access mode, a UE FFP and a gNB FFP are illustrated, while the mere illustration thereof does not mean or require that the UE or gNB has actually initiated (or acquired) a COT for transmission/communication in its respective FFP.

For the further description, it is assumed that the UE has initiated (and acquired) a COT in the UE FFP, i.e. the UE has initiated transmission/communication using this COT in the UE FFP. As explained above, the UE-initiated COT can then be used by the gNB to provide/transmit the clearance indication according to exemplary embodiments of the present disclosure (see FIGS. 6 and 7), while the clearance indication according to exemplary embodiments of the present disclosure could also be provided/transmitted in a gNB-initiated COT if the gNB has initiated (and acquired) a COT in the gNB FFP.

In the below examples, the UE initiates (and acquires) a COT in the present UE FFP for communication during any transmission time interval (TTI) of the UE (as denoted as the left-hand UE FFP) in FIGS. 5 to 7). As is evident from FIGS. 5 to 7 (in which the horizontal direction represents the time), overlapping of a gNB idle period and a UE FFP is assumed, such that there is a collision between a UE COT and a gNB FFP idle period.

FIG. 5 shows a conceptual diagram illustrating two examples of semi-static channel occupancy. In these examples, it is assumed that the UE (which initiated a COT in the UE FFP) is prohibited from transmitting data in the idle period of the gNB FFP. Hence, FIG. 5 represents a conventional situation or approach as outlined in the introductory portion of this specification.

In case (A) illustrated in FIG. 5, the UE-initiated COT overlaps with the gNB idle period. In this case, the UE needs to stop transmitting during the time (i.e. in pre-configured UL transmission occasions) overlapping with the gNB idle period, namely when entering the gNB idle period. This is illustrated by way of the crossed thick-line box. That is, the UE cannot use its TTIs, or at least those parts thereof, which are crossed out in the illustration.

In case (B) illustrated in FIG. 5, the UE idle period (and part of the UE-initiated COT) overlaps with the gNB idle period. In this case, like in case (A) above, the UE needs to stop transmitting during the time (i.e. in pre-configured UL transmission occasions) overlapping with the gNB idle period. This is illustrated by way of the left-hand crossed thick-line box. Additionally, the UE is prevented from initiating/acquiring a COT in the subsequent UE FFP, since the subsequent FFP and thus its COT starts within the gNB idle period. Hence, the UE cannot initiate/acquire the subsequent COT, and cannot transmit at the beginning of the subsequent UE FFP and thus misses the entire subsequent COT. This is illustrated by way of the right-hand crossed thick-line box. That is, the UE cannot use its TTIs, or at least those parts thereof, which are crossed out in the illustration.

For both cases, it is to be noted that the UE may be unable to resume transmission immediately after the gNB idle period, as the UE may need additional time to detect potential gNB transmissions, as well as to align with the start of the next TTI (slot/minisot), conditioned to having a configured/scheduled UL transmission allocation starting after the gNB idle period.

FIG. 6 shows a conceptual diagram illustrating two examples of semi-static channel occupancy according to at least one exemplifying embodiment. In these examples, the same basic situation/scenario as in FIG. 5 is assumed (for enabling comparison), while the concept of clearance indication is utilized, wherein the clearance indication is exemplarily assumed to be provided/transmitted at the beginning of the gNB idle period.

In case (A) illustrated in FIG. 6, which basically corresponds to case (A) of FIG. 5, the gNB determines that it does not intend to communicate in the subsequent gNB FFP, namely that it does not intend to initiate/acquire the subsequent COT (i.e. the COT in the subsequent gNB FFP). Hence, the gNB provides/transmits the clearance indication (CI), which is illustrated by a black box. For monitoring for presence of the clearance indication (CI), the UE may need to stop transmitting (which is illustrated by way of a white/empty box) at the time which is configured as the (potential) clearance indication provision/transmission time according to a corresponding configuration by the gNB, as described above. In this configured monitoring time, the UE monitors/detects (presence of) the clearance indication (CI). Hence, the UE knows that the gNB does not intend to communicate in the subsequent gNB FFP and does not require the gNB idle period. Accordingly, the UE resumes its transmission right after (i.e. as soon as possible, see above) the monitoring period or occasion. As compared with case (A) of FIG. 5, the UE does not loose/miss its TTIs falling in or overlapping the gNB idle period.

Similarly, in case (B) illustrated in FIG. 6, which basically corresponds to case (B) of FIG. 5, the gNB determines that it does not intend to communicate in the subsequent gNB FFP, and provides/transmits the clearance indication (CI), which is illustrated by a black box. For monitoring for presence of the clearance indication (CI), the UE may need to stop transmitting (which is illustrated by way of a white/empty box) at the time which is configured as the (potential) clearance indication provision/transmission time according to a corresponding configuration by the gNB, and monitors/detects (presence of) the clearance indication (CI). Hence, the UE knows that the gNB does not intend to communicate in the subsequent gNB FFP and does not require the gNB idle period. Accordingly, the UE resumes its transmission right after (i.e. as soon as possible, see above) the monitoring period or occasion. Namely, the UE can initiate/acquire the subsequent COT. As compared with case (B) of FIG. 5, the UE at least does not loose/miss, but can use, the entire subsequent COT.

FIG. 7 shows a conceptual diagram illustrating two examples of semi-static channel occupancy according to at least one exemplifying embodiment. In these examples, the same basic situation/scenario as in FIG. 5 is assumed (for enabling comparison), while the concept of clearance indication is utilized, wherein the clearance indication is exemplarily assumed to be provided/transmitted at the beginning of the gNB idle period.

In case (A) illustrated in FIG. 7, which basically corresponds to case (A) of FIG. 5 or 6, the gNB determines that it intends to communicate in the subsequent gNB FFP, namely that it intends to initiate/acquire the subsequent COT (i.e. the COT in the subsequent gNB FFP). Hence, the gNB does not provide/transmit the clearance indication (CI) (or provides/transmits a negative clearance indication or non-clearance indication), which is illustrated by a white box. For monitoring for presence of the clearance indication (CI), the UE may need to stop transmitting (like in case (A) of FIG. 6) at the time which is configured as the (potential) clearance indication provision/transmission time according to a corresponding configuration by the gNB, as described above. In this configured monitoring time, the UE monitors/detects (absence of) the clearance indication (CI). Hence, the UE knows that the gNB intends to communicate in the subsequent gNB FFP and thus requires the gNB idle period. Accordingly, the UE is prevented from and thus needs to stop transmitting during the gNB idle period, namely after the monitoring period or occasion. That is, the UE cannot use its TTIs, or at least those parts thereof, which are crossed out in the illustration, similar to case (A) of FIG. 5.

Similarly, in case (B) illustrated in FIG. 7, which basically corresponds to case (B) of FIG. 5 or 6, the gNB determines that it intends to communicate in the subsequent gNB FFP, and provides/transmits no clearance indication (CI) (or a negative clearance indication or non-clearance indication), which is illustrated by a white box. For monitoring for presence of the clearance indication (CI), the UE may need to stop transmitting (like in case (B) of FIG. 6) at the time which is configured as the (potential) clearance indication provision/transmission time according to a corresponding configuration by the gNB, and monitors/detects (absence of) the clearance indication (CI). Hence, the UE knows that the gNB intends to communicate in the subsequent gNB FFP and thus requires the gNB idle period. Accordingly, the UE is prevented from and thus needs to stop transmitting during the gNB idle period, and is thus prevented from initiating/acquiring a COT in the subsequent UE FFP. That is, the UE cannot initiate/acquire the subsequent COT, and cannot use and thus misses the entire subsequent COT, similar to case (B) of FIG. 5.

As evident from the foregoing description of FIGS. 6 and 7, monitoring for presence of a clearance indication may according to exemplifying embodiments of the present disclosure involve or mean monitoring one or more (pre-configured) monitoring periods or occasions, such as monitoring/decoding resources, for recognizing presence or absence of the clearance indication. In view of the above description, the exemplary operations of the gNB and the UE may be understood and summarized as follows (for illustrative purposes, but in a non-restrictive manner).

The gNB configures the UE to receive an indication which allows the UE to transmit, as initiating device, during the subsequent gNB idle period. The gNB, either as responding device (i.e. in a UE-initiated COT) or as initiating device (in a gNB-initiated COT), transmits the indication to the UE which initiated a COT, possibly also considering the need for (and ability of) the UE to continue transmitting in UL. That is, the gNB sends the indication informing the UE that the gNB does not intend to acquire a COT in the gNB FFP. The UE, which initiated the COT and intends to continue transmitting in UL, monitors for presence of the indication according the configuration from the gNB. Such monitoring may require the UE to stop transmission during the UE-initiated COT, depending on how the indication is provided from the gNB to the UE. If the UE receives such indication, the UE is allowed to resume or continue transmitting e.g. UL data (assuming that it still has e.g. UL data to transmit and another channel (e.g. PUSCH) allocation after the clearance indication) during the gNB idle period within the UE-initiated COT, and/or to initiate a new COT within the gNB idle period of the current or the next upcoming gNB FFP. If the UE does not receive such indication (i.e. if the UE detects a negative indication or no indication at all), the UE refrains from transmitting during the gNB idle period of the current or the next upcoming gNB FFP. So, after having initiated a COT by transmitting at the start of its FFP, the UE should keep silent during the duration of the gNB idle period colliding with the UE-initiated COT only in the case where it does not detect an indication (i.e. a signal, an indicator, a message, or the like) indicating the gNB's intention not to acquire the COT in the gNB FFP.

Figure 8:
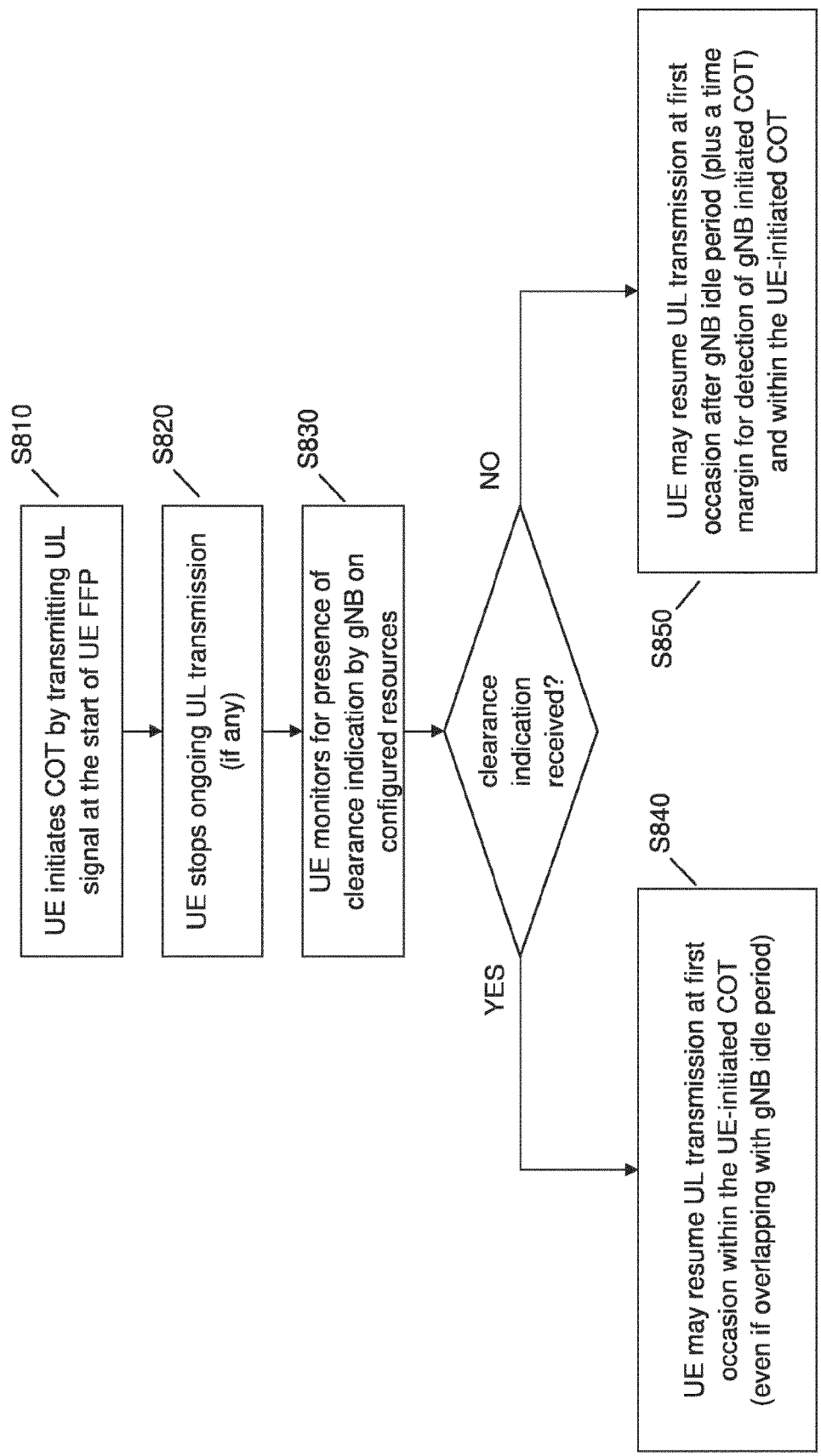
FIG. 8 shows a flowchart illustrating an example of a method or process according to at least one exemplifying embodiment.

FIG. 8 shows a flowchart illustrating an example of a method or process according to at least one exemplifying embodiment. The method or process of FIG. 8 is illustrated in view of the above examples, and is operable at or by the thus exemplified UE.

Here, it is exemplarily assumed that the UE initiates a COT by transmitting a UL signal at the start of the UE FFP (S810). Then, the UE stops an ongoing UL transmission if any (S820), and monitors for presence of the clearance indication by the gNB on the configured resources (S830).

In case the clearance indication is received/present, the UE is allowed to resume the UL transmission at the first (pre-configured) occasion within the UE-initiated COT even if overlapping with the gNB idle period (S840). In case the clearance indication is not received/present, the UE is prevented from resuming the UL transmission within the gNB idle period but is allowed to resume the UL transmission (if needed) at the first (pre-configured) occasion after (the end of) the gNB idle period (plus a time margin for detection of the gNB initiated-COT) and within the UE-initiated COT (S850).

As indicated above, it may not be necessary to stop an ongoing UL transmission for the monitoring, e.g. when the clearance indication is provided implicitly such as in the context of an UL schedule, when the clearance indication is provided by way of high level signaling, or the like. If so, stopping an ongoing UL transmission is not necessary, and the UL transmission may be continued rather than resumed in S840.

Figure 9:
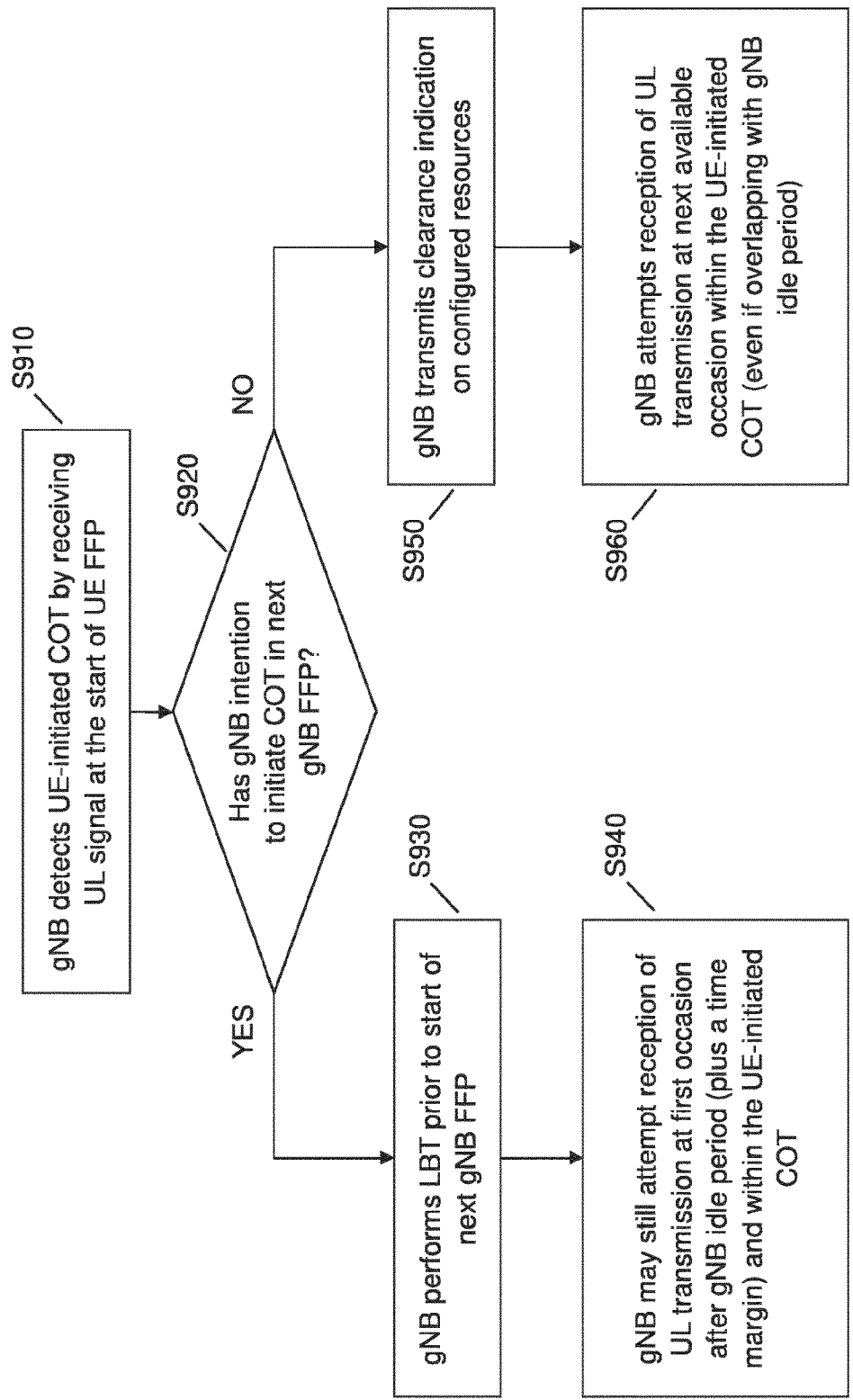
FIG. 9 shows a flowchart illustrating an example of a method or process according to at least one exemplifying embodiment.

FIG. 9 shows a flowchart illustrating an example of a method or process according to at least one exemplifying embodiment. The method or process of FIG. 9 is illustrated in view of the above examples, and is operable at or by the thus exemplified gNB.

Here, it is assumed that the gNB detects a UE-initiated COT by receiving a UL signal at the start of the UE FFP (S910), and then determines whether or not it has an intention to initiate a COT in the next gNB FFP (S920). In case of YES in S920, the gNB performs LBT prior to the start of the next gNB FFP, i.e. in the gNB idle period (S930). Then, the gNB may still attempt reception of UL transmission at the first (pre-configured) occasion after the gNB idle period (plus a time margin) and within the UE-initiated COT (S940). In case of NO in S920, the gNB transmits the clearance indication on the configured resources (S950), and attempts reception of UL transmission at the next available (pre-configured) occasion within the UE-initiated COT even if overlapping with gNB idle period (S960).

Figure 10:
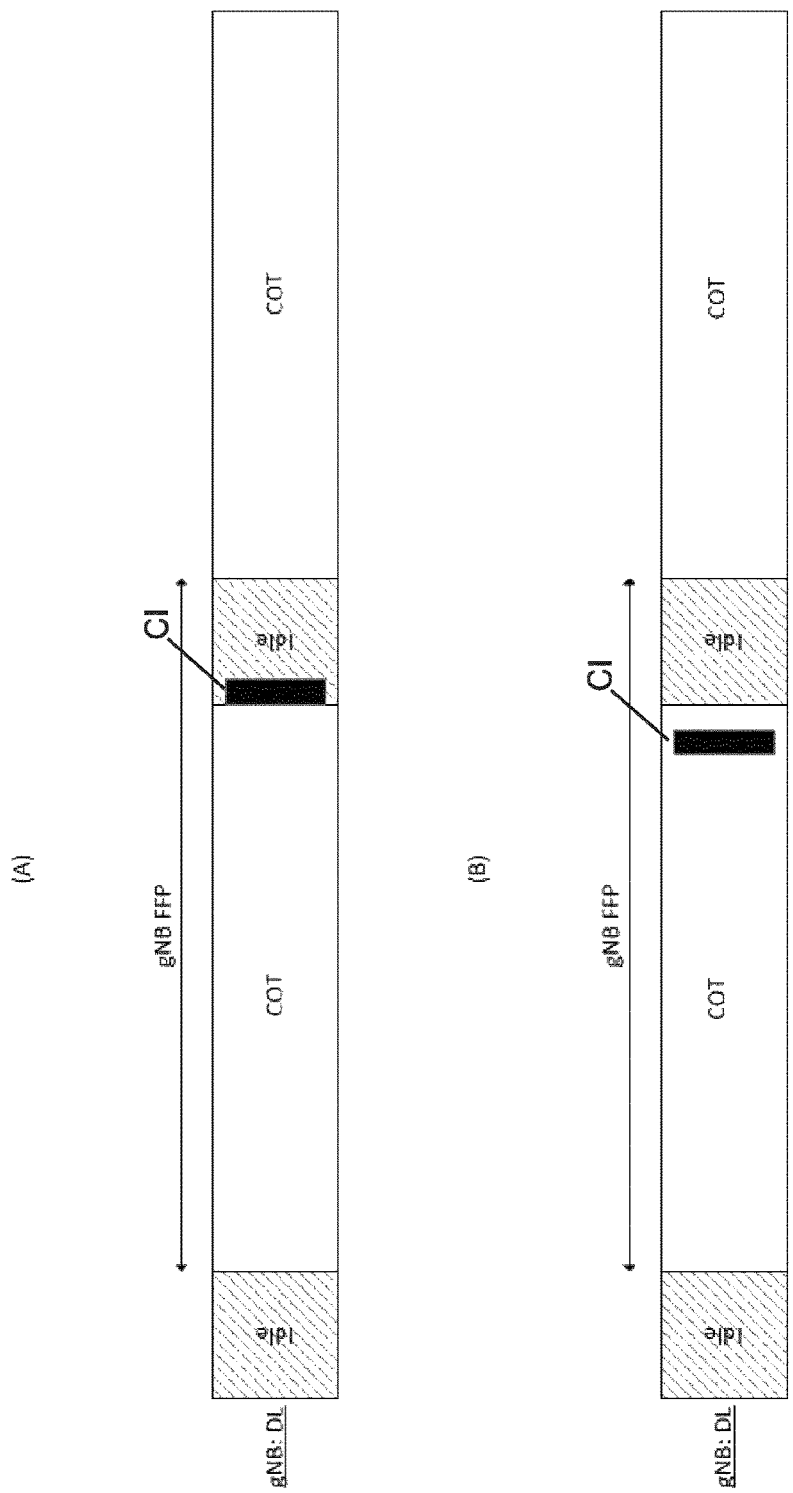
FIG. 10 shows a conceptual diagram illustrating two examples of the location of a clearance indication in semi-static channel occupancy according to at least one exemplifying embodiment.

Referring to the above examples illustrated in FIGS. 5 to 7, it is exemplarily assumed that the clearance indication is provided/transmitted by the gNB during (i.e. at the start/beginning of) the gNB idle period. However, the clearance indication may be provided/transmitted by the gNB prior to the gNB idle period. Namely, it may also be defined that the clearance indication (or any other DL signal) is to be transmitted during the symbols not overlapping with the gNB's idle period (e.g. in the symbols immediately preceding the gNB idle period). This is illustrated in FIG. 10 which shows a conceptual diagram illustrating two examples of the location of a clearance indication CI (denoted by a black box) in semi-static channel occupancy according to at least one exemplifying embodiment.

In these two examples, the indication is transmitted by the gNB during (e.g. at the start of) the idle period of the gNB FFP. However, it may also be defined that the indication (or any other DL signal) must be transmitted during the symbols not overlapping with the gNB's idle period (e.g. in the symbols immediately preceding the gNB idle period).

Referring to the above examples illustrated in FIGS. 5 to 7, as explained above, the clearance indication may be provided/transmitted by the gNB acting as responding device, i.e. within a UE-initiated COT. That is, when the gNB detects a UL transmission from the UE starting from the beginning of the configured UE FFP, it can share the UE-initiated COT for providing/transmitting the clearance indication. Alternatively or additionally, the clearance indication may be provided/transmitted by the gNB acting as initiating device, i.e. within a gNB-initiated COT, namely during the FFP that it has initiated itself.

As is evident from the above, according to exemplary embodiments of the present disclosure, it is possible to realize/enable support for idle period communication in semi-static channel access in a flexible, efficient and appropriate manner, such as e.g. support for UE-initiated COT for Frame Based Equipment (FBE), like UE communication during an idle period of a gNB in semi-static channel access mode (i.e. a gNB FFP). By controlling the usability of the idle period within a base station device frame period (e.g. gNB FFP) depending on the base station device's own intention of communication in the base station device frame period (and, optionally, also depending on the user equipment device's communication prospect/intention) using a clearance indication, a UL restriction of the user equipment device can be obviated (in that the user equipment device is generally allowed to initiate and transmit in (a channel occupancy time of) its own user equipment device frame period (e.g. UE FFP)) while avoiding drawbacks of (unconditionally) allowing or prohibiting UL transmissions of the user equipment device in the overlapping idle period of a base station device frame period (e.g. gNB FFP).

According to exemplary embodiments of the present disclosure, the clearance indication can be provided from the base station device to the user equipment device in any manner, as long as the user equipment device is thereby enabled to know or infer non-/clearance for communication by the user equipment device in an idle period within a base station device frame period or, stated in other words, non-/intention of the base station device to communicate in the subsequent base station device frame period. For example, such clearance indication may be provided in an explicit or implicit manner, it can be provided by way of transmission, or the like.

In the following, examples for providing the clearance indication from the base station device to the user equipment device according to exemplary embodiments of the present disclosure are described for illustrative (but not limiting) purposes. While the terminology with regard to the exemplary system is adopted hereinafter, this is only for the sake of simplicity/intelligibility, while the thus described examples are not limited thereby accordingly.

Firstly, the clearance indication may be provided by way of transmission of a clearance indication message, signal, indicator or information or the like from the base station device to the user equipment device. That is, the base station device may cause such transmission, and the user equipment device may monitor reception of such transmission. The clearance indication can be transmitted in, in the form of or as part of at least one of downlink control information, reference signals, higher layer signaling.

As stated above, downlink control information (DCI) can be used for providing, i.e. transmitting, the clearance indication. That is, the clearance indication may be is sent by the gNB in DL direction as part of Downlink Control Information (DCI) to the UE. The DCI can be sent only to the specific UE which initiated the COT (e.g. using UE-specific RNTI), or could be sent to many or all UEs being served by the gNB, e.g through GC-PDCCH with DCI format 2_0, which would allow the target UE and possibly other UEs to detect the clearance indication and interpret that the gNB will keep acting as a responding device of the UE acting as the initiating device (for the UE-initiated COT), at least for the subsequent gNB FFP. The clearance indication in the DCI may consist e.g. of a single bit, with '1' indicating that UL transmission within a UE FFP and initiation of a UL FFP is allowed during the idle period of the gNB FFP, and '0' indicating the opposite, or vice versa. In case the UE fails to detect the DCI message carrying the clearance indication, it shall assume that UL transmission and initiation of a UE FFP is not permitted during the next or current idle period of the gNB FFP, and that the gNB may attempt to acquire the channel for the next gNB FFP. Alternatively, the clearance indication may be encoded jointly with a "COT duration" field in DCI 2_0, where e.g. indication of a remaining channel occupancy time that overlaps with the gNB idle period is interpreted by the UE as "UL transmission overlapping with the gNB idle period allowed in a UE-initiated FFP".

As stated above, reference signals (RS) can be used for providing, i.e. transmitting, the clearance indication. That is, the clearance indication may be sent by the gNB in DL direction in the form of one or more reference signals which can be robustly detected by the UE, e.g. as a specific DMRS or a CSI-RS signal or sequence. The simple detection of the signal during the configured monitoring period or occasion may be treated as a positive indication, i.e. a clearance for transmitting in, at least, one gNB idle period.

As stated above, signaling such as higher layer signaling can be used for providing, i.e. transmitting, the clearance indication. As one example, the clearance indication (CI) may be sent within the gNB idle period, e.g. at the beginning of the gNB idle period, as illustrated as case (A) in FIG. 10. In this case, just by detecting that the gNB is transmitting during its own idle period (as a responding device), the UE may determine that the gNB intends to keep behaving as a responding device, at least for the subsequent gNB FFP. The UE is therefore allowed to resume transmission (conditioned to LBT success if gap is >16☐s, as described above) and/or initiate a new COT during the gNB idle period. As another example, the clearance indication (CI) may be sent prior to the start of the gNB idle period, as illustrated as case (B) in FIG. 10. This is even feasible in the case where the gNB is not allowed to transmit in its own idle period even when acting as responding device.

Further, the clearance indication may be configured so as to allow the UE to transmit within the gNB idle period through higher layer signaling. This could be the case where the gNB knows a priori that the UE will have data to transmit in a time or occasions overlapped with the gNB idle period, e.g. based on information from TSCAI for periodic deterministic TSC traffic. It is to be noted that, in this case, as the clearance indication is not dynamic but configured by higher layer signaling (e.g. RRC), the UE is not required to stop transmission during the UE-initiated COT, prior to the gNB idle period, to monitor for presence of the clearance indication by the gNB. This may be applicable at least for deterministic UL traffic with moderate periodicity to avoid gNB starvation, or gNB can make sure by proper FFP configuration that at least some gNB FFPs start within the UE idle period, so that the gNB can get the channel in certain occasions to transmit DL signaling if needed.

Still further, the clearance indication may be configured to be valid for more than one gNB idle period. For example, the gNB may configure, e.g. by RRC signaling, or inform along the clearance indication (e.g. in a DCI field) that the gNB is not interested in communicating and thus acquiring the COT for next N gNB FFPs. Then, the UE which has initiated a COT is allowed to transmit in all times or occasions overlapping with the corresponding N gNB idle periods. Thereby, channel occupancy and monitoring occasions can be reduced, with the potential cost from the gNB side to have fewer occasions to acquire the COT for transmitting in DL. This approach may be applicable in cases of UL dominant traffic.

Secondly, the clearance indication may be provided by way of an implicit or indirect configuration such as a scheduling. For example, the base station device may provide a schedule for uplink transmission by the user equipment device to the user equipment device, and the user equipment device may monitor provision of the schedule and infer presence of the clearance indication when the provided schedule for uplink transmission by the user equipment device includes a transmission time partially or fully overlapping the idle period within the base station device frame period.

The UE may be scheduled by the gNB via an UL grant (e.g. DCI format 0_0 or 0_1) to transmit during the gNB idle period, and within a UE-initiated COT. In this case, the signaling of the clearance indication (i.e. that the gNB does not intend to acquire a COT in the next gNB FFP) may be implicitly carried by the time domain resource assignment field in the DCI. Namely, if the time domain resource assignment partially or fully overlaps with the gNB idle period, the UE infers or assumes that the gNB does not intend to acquire a COT in the next gNB FFP, and it can therefore initiate an UL transmission using the UE-initiated COT even during the gNB idle period (besides the scheduled UL transmission).

Generally, it is to be noted that exemplifying embodiments of the present disclosure, as explained above, are applicable for any situation or environment, in which a base station device and a user equipment device are connected or linked via at least one channel of a (wireless/cellular) communication system and cooperate for semis-static channel access (on an unlicensed spectrum), irrespective of the nature, direction or orientation of the actual communication/transmission of these devices. Namely, the above description mainly refers to UL communication/transmission from the user equipment device to the base station device, while the present disclosure is not limited thereto. As indicated above, the concept of the clearance indication according to exemplifying embodiments of the present disclosure is for example equally be applicable for sidelink communication/transmission from the involved user equipment device to another user equipment device (which is also referred to as Device-to-Device, or D2D, communication/transmission), or any other kind of communication/transmission relating to the involved user equipment device. In the case of sidelink communication/transmission, the clearance indication can be provided in a sidelink channel, for example in sidelink control information, and the involved user equipment device monitoring for presence of the clearance indication, if the clearance indication is not detected, may refrain from transmitting during the idle period of another user equipment device.

By virtue of exemplifying embodiments of the present disclosure, as evident from the above, support for idle period communication in semi-static channel access can be enabled/realized. One or more exemplifying embodiments of the present disclosure provide various measures/mechanisms (such as functions, extensions of functions and procedures) that facilitate, with regard to the above example scenario, obviating a currently imposed UE UL restriction and providing for an appropriate support for UE-initiated COT for Frame Based Equipment (FBE), namely UE communication during an idle period of a gNB in semi-static channel access mode (i.e. a gNB FFP).

The above-described methods, procedures and functions may be implemented by respective functional elements, entities, modules, units, processors, or the like, as described below.

While in the foregoing exemplifying embodiments of the present disclosure are described mainly with reference to methods, procedures and functions, corresponding exemplifying embodiments of the present disclosure also cover respective apparatuses, entities, modules, units, network nodes and/or systems, including both software and/or hardware thereof.

Respective exemplifying embodiments of the present disclosure are below referring to FIGS. 11 to 13, while for the sake of brevity reference is made to the detailed description of respective corresponding configurations/setups, schemes, processes, sequences, methods as well as functionalities, principles and operations according to FIGS. 1 to 10.

Figure 11:
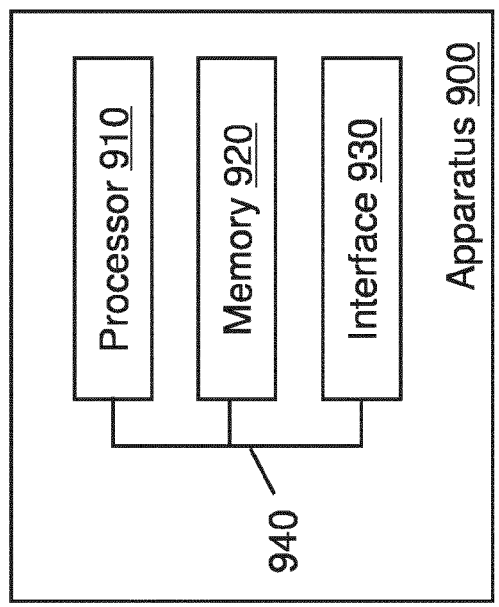
FIG. 11 shows a schematic diagram illustrating an example of a structure of an apparatus according to at least one exemplifying embodiment.
Figure 12:
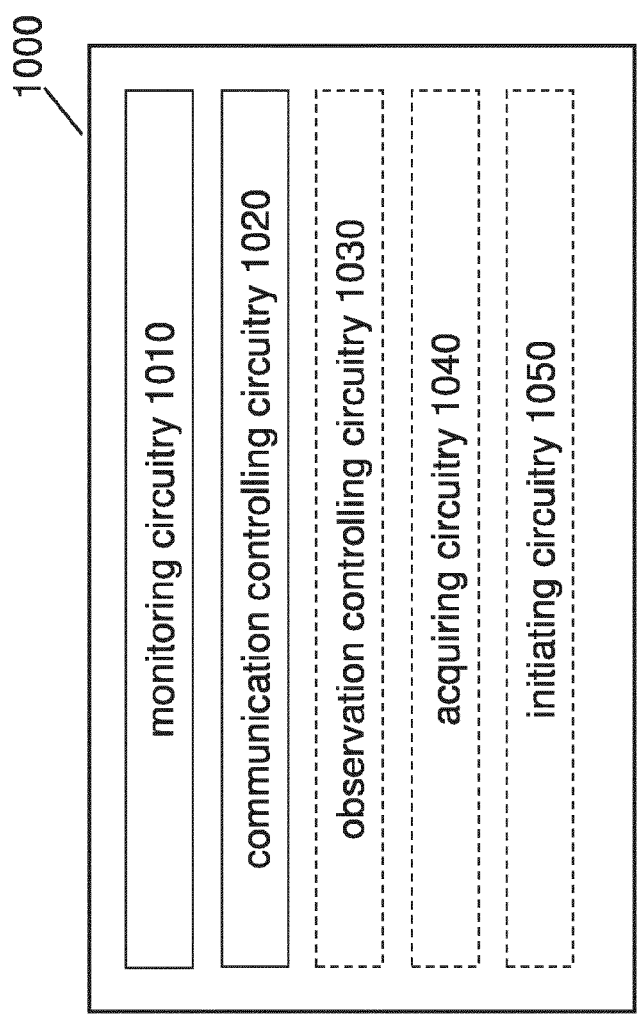
FIG. 12 shows a schematic diagram illustrating an example of a structure of an apparatus according to at least one exemplifying embodiment.
Figure 13:
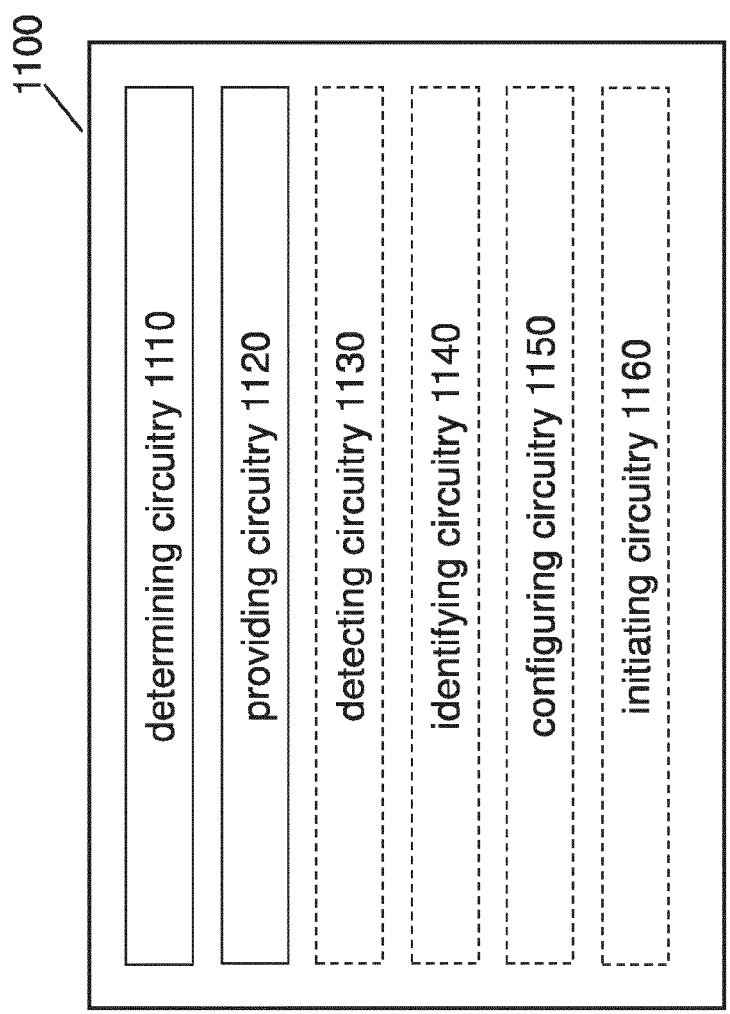
FIG. 13 shows a schematic diagram illustrating an example of a structure of an apparatus according to at least one exemplifying embodiment.

In FIGS. 11 to 13, the blocks are basically configured to perform respective methods, procedures and/or functions as described above. The entirety of blocks are basically configured to perform the methods, procedures and/or functions as described above, respectively. With respect to FIGS. 11 to 13, it is to be noted that the individual blocks are meant to illustrate respective structural or functional blocks implementing/realizing a respective function, process or procedure, respectively. Such structural or functional blocks are implementation-independent, i.e. may be implemented by means of any kind of hardware or software or combination thereof, respectively.

Further, in FIGS. 11 to 13, only those structural or functional blocks are illustrated, which relate to any one of the above-described methods, procedures and/or functions. A skilled person will acknowledge the presence of any other conventional structural or functional blocks required for an operation of respective structural arrangements, such as e.g. a power supply, a central processing unit, respective memories or the like. Among others, one or more memories are provided for storing programs or program instructions for controlling or enabling the individual structural or functional blocks or any combination thereof to operate as described herein in relation to exemplifying embodiments.

FIG. 11 shows a schematic diagram illustrating an example of a structure of an apparatus according to at least one exemplifying embodiment. Herein, an apparatus can represent a physical entity, i.e. a structural device implementing a specific network element, entity or function or the functionality thereof as such.

As indicated in FIG. 11, according to at least one exemplifying embodiment, an apparatus 900 may comprise at least one processor 910 and at least one memory 920 (and possibly also at least one interface 930), which may be operationally connected or coupled, for example by a bus 940 or the like, respectively.

The processor 910 and/or the interface 930 of the apparatus 900 may also include a transceiver, a modem or the like to facilitate communication over a (hardwire or wireless) link, respectively. The interface 930 of the apparatus 900 may include a suitable transmitter, receiver or transceiver connected or coupled to one or more antennas, antenna units, such as antenna arrays or communication facilities or means for (hardwire or wireless) communications with the linked, coupled or connected device(s), respectively. The interface 930 of the apparatus 900 is generally configured to communicate with at least one other apparatus, device, node or entity (in particular, the interface thereof), i.e. to establish a link or connection to another apparatus, device, node or entity (in particular, the interface thereof).

The memory 920 of the apparatus 900 may represent a (non-transitory/tangible) storage medium (e.g. RAM, ROM, EPROM, EEPROM, etc.) and store respective software, programs, program products, macros or applets, etc. or parts of them, which may be assumed to comprise program instructions or computer program code that, when executed by the respective processor, enables the respective electronic device or apparatus to operate in accordance with the exemplifying embodiments of the present disclosure. Further, the memory 920 of the apparatus 900 may (comprise a database to) store any data, information, or the like, which is used in the operation of the apparatus.

In general terms, respective apparatuses (and/or parts thereof) may represent means or element for performing respective operations and/or exhibiting respective functionalities, and/or the respective devices (and/or parts thereof) may have functions for performing respective operations and/or exhibiting respective functionalities.

In view of the above, the thus illustrated apparatus 900 is suitable for use in practicing one or more of the exemplifying embodiments, as described herein.

When in the subsequent description it is stated that the processor (or some other means) is configured to perform some function, this is to be construed to be equivalent to a description stating that a (i.e. at least one) processor or corresponding circuitry, potentially in cooperation with a computer program code stored in a (i.e. at least one) memory of the respective apparatus or otherwise available (it should be appreciated that the memory may also be an external memory or provided/realized by a cloud service or the like), is configured to cause the apparatus to perform at least the thus mentioned function. It should be appreciated that herein processors, or more generally processing portions, are to be considered to represent physical portions of one or more processors, but might also be considered as a logical division of the referred processing tasks performed by one or more processors.

According to at least one exemplifying embodiment, the thus illustrated apparatus 900 may represent or realize/embody a (part of a) user equipment device, such as e.g. a user equipment device in a FBE(-based) communication system, e.g. a UE in a 5G/NR-U system. Accordingly, the apparatus 900 may be configured to perform a procedure and/or exhibit a functionality and/or implement a mechanism, as described for a user equipment device or UE in any one of FIGS. 1 to 10.

In this regard, the apparatus 900 may be caused or the apparatus 900 or its at least one processor 910 (possibly together with computer program code stored in its at least one memory 920), in its most basic form, may be configured to at least perform monitoring for presence of a clearance indication provided by a base station device serving the user equipment device, which indicates clearance for communication by the user equipment device in at least one idle period of a base station device frame period, and disabling communication by the user equipment device in the idle period of the base station device frame period when the monitoring yields absence of the clearance indication, or enabling communication by the user equipment device in the idle period of the base station device frame period when the monitoring yields presence of the clearance indication.

According to at least one exemplifying embodiment, the thus illustrated apparatus 900 may represent or realize/embody a (part of a) base station device, such as e.g. a base station device in a FBE(-based) communication system, e.g. a gNB in a 5G/NR-U system. Accordingly, the apparatus 900 may be configured to perform a procedure and/or exhibit a functionality and/or implement a mechanism, as described for a base station device or UE in any one of FIGS. 1 to 10.

In this regard, the apparatus 900 may be caused or the apparatus 900 or its at least one processor 910 (possibly together with computer program code stored in its at least one memory 920), in its most basic form, may be configured to at least perform determining intention of communication by the base station device in a channel occupancy time of a base station device frame period, providing a clearance indication to a user equipment device served by the base station, which indicates clearance for communication by the user equipment device in an idle period of the base station device frame period.

As mentioned above, an apparatus according to at least one exemplifying embodiment may be structured by comprising respective one or more circuitries (possibly as part of the one or more processors 910) configured to perform corresponding operations, procedures and/or functions or respective one or more units or means for performing corresponding operations, procedures and/or functions. Such one or more circuitries, units or means may be implemented/realized on the basis of an apparatus structure, as exemplified in FIG. 11, i.e. by one or more processors 910, one or more memories 920, one or more interfaces 930, or any combination thereof.

FIG. 12 shows a schematic diagram illustrating an example of a structure of an apparatus according to at least one exemplifying embodiment.

As shown in FIG. 12, an apparatus 1000 according to at least one exemplifying embodiment may represent or realize/embody a (part of a) apparatus with the functionality/operability of a user equipment device as described herein above. Accordingly, such apparatus 1000 may comprise (at least) a monitoring circuitry 1010, which represents any implementation for (or configured to) monitoring (monitor) for presence of a clearance indication provided by a base station device serving a user equipment device, which indicates clearance for communication by the user equipment device in at least one idle period of a base station device frame period, and a communication controlling circuitry 1020, which represents any implementation for (or configured to) controlling (control) communication by the user equipment device, including disabling communication by the user equipment device in the at least one idle period of the base station device frame period when the monitoring yields absence of the clearance indication, or enabling communication by the user equipment device in the at least one idle period of the base station device frame period when the monitoring yields presence of the clearance indication.

As indicated by dashed boxes, such apparatus 1000 may also comprise one or more of:

an observation controlling circuitry 1030, which represents any implementation for (or configured to) controlling (control) downlink transmission observation, including inhibiting observation of at least some downlink transmissions by and/or downlink channels from the base station device in at least part of a subsequent channel occupancy time of the base station device frame period when the monitoring yields presence of the clearance indication, or performing observation of at least some downlink transmissions by and/or downlink channels from the base station device in at least part of a subsequent channel occupancy time of the base station device frame period when the monitoring yields absence of the clearance indication, an acquiring circuitry 1040, which represents any implementation for (or configured to) acquiring (acquire) a configuration for monitoring for presence of the clearance indication, said configuration including information on provision of the clearance indication by the base station device, an initiating circuitry 1050, which represents any implementation for (or configured to) initiating (initiate) a channel occupancy time for communication by the user equipment device.

FIG. 13 shows a schematic diagram illustrating an example of a structure of an apparatus according to at least one exemplifying embodiment.

As shown in FIG. 13, an apparatus 1100 according to at least one exemplifying embodiment may represent or realize/embody a (part of a) apparatus with the functionality/operability of a base station device as described herein above. Accordingly, such apparatus 1100 may comprise (at least) a determining circuitry 1110, which represents any implementation for (or configured to) determining (determine) intention of communication by a base station device in a channel occupancy time of a base station device frame period, and a providing circuitry 1120, which represents any implementation for (or configured to) providing (provide) a clearance indication to a user equipment device served by the base station, which indicates clearance for communication by the user equipment device in at least one idle period of the base station device frame period.

As indicated by dashed boxes, such apparatus 1100 may also comprise one or more of:

a detecting circuitry 1130, which represents any implementation for (or configured to) detecting (detect) initiation of a channel occupancy time for communication by the user equipment device in a user equipment device frame period, an identifying circuitry 1140, which represents any implementation for (or configured to) identifying (identify) at least one of a need or ability of the user equipment device to communicate in the at least one idle period of the base station device frame period, a configuring circuitry 1150, which represents any implementation for (or configured to) configuring (configure) the user equipment device for monitoring for presence of the clearance indication, said configuration including information on provision of the clearance indication by the base station device, an initiating circuitry 1160, which represents any implementation for (or configured to) initiating (initiate) a channel occupancy time for communication by the base station device.

For further details regarding the operability/functionality of the apparatuses (or circuitries, units, means, etc. thereof) according to exemplifying embodiments, reference is made to the above description in connection with any one of FIGS. 1 to 10, respectively.

According to exemplifying embodiments of the present disclosure, any one of the (at least one) processor, the (at least one) memory and the (at least one) interface, as well as any one of the illustrated units/means, may be implemented as individual modules, chips, chipsets, circuitries or the like, or one or more of them can be implemented as a common module, chip, chipset, circuitry or the like, respectively.

According to exemplifying embodiments of the present disclosure, a system may comprise any conceivable combination of any depicted or described apparatuses and other network elements or functional entities, which are configured to cooperate as described above.

In general, it is to be noted that respective structural or functional blocks or elements according to above-described aspects can be implemented by any known means, either in hardware and/or software, respectively, if it is only adapted to perform the described functions of the respective parts. The mentioned method steps can be realized in individual functional blocks or by individual devices, or one or more of the method steps can be realized in a single functional block or by a single device.

Generally, a basic system architecture of a (tele)communication network including a mobile communication system where some examples of exemplifying embodiments are applicable may include an architecture of one or more communication networks including wireless access network sub-/system(s) and possibly core network(s). Such an architecture may include one or more communication network control elements or functions, such as e.g. access network elements, radio access network elements, access service network gateways or base transceiver stations, like a base station, an access point, a NodeB (NB), an eNB or a gNB, a distributed or a centralized unit, which controls a respective coverage area or cell(s) and with which one or more communication stations such as communication elements or functions, like user devices or terminal devices, like a UE, or another device having a similar function, such as a modem chipset, a chip, a module etc., which can also be part of a station, an element, a function or an application capable of conducting a communication, such as a UE, an element or function usable in a machine-to-machine communication architecture, or attached as a separate element to such an element, function or application capable of conducting a communication, or the like, are capable to communicate via one or more channels via one or more communication beams for transmitting several types of data in a plurality of access domains. Furthermore, core network elements or network functions, such as gateway network elements/functions, mobility management entities, a mobile switching center, servers, databases and the like may be included.

The general functions and interconnections of the described elements and functions, which also depend on the actual network type, are known to those skilled in the art and described in corresponding specifications, so that a detailed description thereof is omitted herein. It should be appreciated that several additional network elements and signaling links may be employed for a communication to or from an element, function or application, like a communication endpoint, a communication network control element, such as a server, a gateway, a radio network controller, and other elements of the same or other communication networks besides those described in detail herein below.

A communication network architecture as being considered in examples of exemplifying embodiments may also be able to communicate with other networks, such as a public switched telephone network or the Internet, including the Internet-of-Things. The communication network may also be able to support the usage of cloud services for virtual network elements or functions thereof, wherein it is to be noted that the virtual network part of the (tele)communication network can also be provided by non-cloud resources, e.g. an internal network or the like. It should be appreciated that network elements of an access system, of a core network etc., and/or respective functionalities may be implemented by using any node, host, server, access node or entity etc. being suitable for such a usage. Generally, a network function can be implemented either as a network element on a dedicated hardware, as a software instance running on a dedicated hardware, or as a virtualized function instantiated on an appropriate platform, e.g. a cloud infrastructure.

Any method step is suitable to be implemented as software or by hardware without changing the idea of the present disclosure. Such software may be software code independent and can be specified using any known or future developed programming language, such as e.g. Java, C++, C, and Assembler, as long as the functionality defined by the method steps is preserved. Such hardware (which may be considered as one or more circuitries) may be hardware type independent and can be implemented using any known or future developed hardware technology or any hybrids of these, such as MOS (Metal Oxide Semiconductor), CMOS (Complementary MOS), BiMOS (Bipolar MOS), BiCMOS (Bipolar CMOS), ECL (Emitter Coupled Logic), TTL (Transistor-Transistor Logic), etc., using for example ASIC (Application Specific IC (Integrated Circuit)) components, FPGA (Field-programmable Gate Arrays) components, CPLD (Complex Programmable Logic Device) components or DSP (Digital Signal Processor) components. A device/apparatus may be represented by a semiconductor chip, a chipset, or a (hardware) module comprising such chip or chipset; this, however, does not exclude the possibility that a functionality of a device/apparatus or module, instead of being hardware implemented, be implemented as software in a (software) module such as a computer program or a computer program product comprising executable software code portions for execution/being run on a processor. A device may be regarded as a device/apparatus or as an assembly of more than one device/apparatus, whether functionally in cooperation with each other or functionally independently of each other but in a same device housing, for example.

Apparatuses and/or units/means or parts thereof can be implemented as individual devices, but this does not exclude that they may be implemented in a distributed fashion throughout the system, as long as the functionality of the device is preserved. Such and similar principles are to be considered as known to a skilled person.

Software in the sense of the present description comprises software code as such comprising code means or portions or a computer program or a computer program product for performing the respective functions, as well as software (or a computer program or a computer program product) embodied on a tangible medium such as a computer-readable (storage) medium having stored thereon a respective data structure or code means/portions or embodied in a signal or in a chip, potentially during processing thereof.

The present disclosure also covers any conceivable combination of method steps and operations described above, and any conceivable combination of nodes, apparatuses, modules or elements described above, as long as the above-described concepts of methodology and structural arrangement are applicable.

In view of the above, there are provided measures for enabling/realizing support for idle period communication in semi-static channel access. Such measures exemplarily comprise that a user equipment device monitors presence of a clearance indication provided by a base station device serving the user equipment device, which indicates clearance for communication by the user equipment device in at least one idle period of a base station device frame period, disables communication by the user equipment device in the at least one idle period of the base station device frame period when the monitoring yields absence of the clearance indication, and enables communication by the user equipment device in the at least one idle period of the base station device frame period when the monitoring yields presence of the clearance indication.

Even though the present disclosure is described above with reference to the examples according to the accompanying drawings, it is to be understood that the present disclosure is not restricted thereto. Rather, it is apparent to those skilled in the art that the present disclosure can be modified in many ways without departing from the scope of the inventive idea as disclosed herein.

LIST OF ACRONYMS AND ABBREVIATIONS

3GPP 3rd Generation Partnership Project
5G $5^{th}$ Generation
BSR Buffer Status Report
CG-PUSCH Configured grant PUSCH
CSI-RS Channel State Information Reference Signal
COT Channel Occupancy Time
D2D Device-to-Device
DMRS Demodulation Reference Signal
DCI Downlink Control Indicator
DL Downlink
FBE Frame Based Equipment
FFP Fixed Frame Period
gNB gNodeB (5G/NR base station)
GC-PDCCH Group-Common PDCCH
IIoT Industrial Internet of Things
LBT Listen-Before-Talk
NR New Radio
NR-U New Radio—Unlicensed
PDCCH Physical Downlink Control Channel
PRACH Physical Random Access Channel
PUCCH Physical Uplink Control Channel
PUSCH Physical Uplink Shared Channel
RNTI Radio Network Temporary Identifier
RRC Radio Resource Control
RS Reference Signal
SCS Sub-Carrier Spacing
SIB System Information Block
SR Scheduling Request
SSB Synchronization Signal Block
TSC Time Sensitive Communication
TSCAI TSC Assistance Information
TTI Transmission Time Interval
UE User Equipment
UL Uplink
URLLC Ultra-Reliable Low-Latency Communication

The invention claimed is:

1. An apparatus for wireless communication in a communication system supporting semi-static channel access, said apparatus comprising
at least one processor; and
at least one memory including computer program code, wherein the at least one memory and the computer program code are configured, with the at least one processor, to cause the apparatus at least to perform:
acquiring a configuration for monitoring for presence of a clearance indication provided by a base station device serving a user equipment device, which indicates clearance for communication by the user equipment device in at least one idle period of a base station device frame period,
wherein the clearance indication is provided by the base station device in a channel occupancy time of a user equipment device frame period or a channel occupancy time of the base station device frame period,
wherein the configuration includes information on provision of the clearance indication by the base station device, and
wherein presence of the clearance indication is monitored in accordance with the acquired configuration;
monitoring for presence of the clearance indication by monitoring at least one pre-configured monitoring period;
prior to the at least one idle period of the base station device frame period, monitoring reception of a clearance indication message, signal, indicator or information from the base station device;
when the clearance indication is not present:
  disabling communication by the user equipment device in the at least one idle period of the base station device frame period when the monitoring yields absence of the clearance indication,
  suspending transmission by the user equipment device in a channel occupancy time of a user equipment device frame period,
  resuming transmission by the user equipment device in a channel occupancy time of a user equipment device frame period after the at least one idle period of the base station device frame period, and
  performing observation of at least some downlink transmissions by and downlink channels from the base station device in at least part of a subsequent channel occupancy time of the base station device frame period when the monitoring yields absence of the clearance indication; and
when the clearance indication is present:
  enabling communication by the user equipment device in the at least one idle period of the base station device frame period when the monitoring yields presence of the clearance indication,
  continuing transmission by the user equipment device in a channel occupancy time of a user equipment device frame period,
  resuming transmission by the user equipment device in a channel occupancy time of a user equipment device frame period,
  initiating a new channel occupancy time for communication by the user equipment device in a subsequent user equipment device frame period, and
  inhibiting observation of at least some downlink transmissions by and downlink channels from the base station device in at least part of a subsequent channel occupancy time of the base station device frame period when the monitoring yields presence of the clearance indication.

* * * * *